US008699119B2

(12) United States Patent
Nakagawa et al.

(10) Patent No.: US 8,699,119 B2
(45) Date of Patent: Apr. 15, 2014

(54) ELECTRONIC PAPER AND METHOD FOR PRODUCING SAME

(75) Inventors: Masami Nakagawa, Osaka (JP); Akinori Toyoda, Fukuoka (JP)

(73) Assignee: Panasonic Corporation, Osaka (JP)

(*) Notice: Subject to any disclaimer, the term of this patent is extended or adjusted under 35 U.S.C. 154(b) by 171 days.

(21) Appl. No.: 13/258,648

(22) PCT Filed: Jan. 25, 2011

(86) PCT No.: PCT/JP2011/000370
§ 371 (c)(1),
(2), (4) Date: Jan. 5, 2012

(87) PCT Pub. No.: WO2011/096169
PCT Pub. Date: Aug. 11, 2011

(65) Prior Publication Data
US 2012/0105942 A1    May 3, 2012

(30) Foreign Application Priority Data

Feb. 3, 2010    (JP) .................................. 2010-021763

(51) Int. Cl.
G02B 26/00    (2006.01)
(52) U.S. Cl.
USPC ........................................................ 359/296
(58) Field of Classification Search
USPC ......................................... 359/296; 345/107
See application file for complete search history.

(56) References Cited

U.S. PATENT DOCUMENTS

| 5,812,226 | A | 9/1998 | Izumi et al. |
| 6,407,763 | B1 | 6/2002 | Yamaguchi et al. |
| 6,876,486 | B2* | 4/2005 | Hiraoka et al. ............... 345/107 |
| 7,408,697 | B2* | 8/2008 | Kawai ............................ 359/296 |
| 7,535,539 | B2* | 5/2009 | Sakurai et al. ................ 349/155 |

(Continued)

FOREIGN PATENT DOCUMENTS

| JP | 3-13984 | 1/1991 |
| JP | 8-122769 | 5/1996 |

(Continued)

OTHER PUBLICATIONS

English translation of International Preliminary Report on Patentability and Written Opinion of the International Searching Authority, issued Sep. 27, 2012 in International (PCT) Application No. PCT/JP2011/000370.

(Continued)

*Primary Examiner* — Tuyen Tra
(74) *Attorney, Agent, or Firm* — Wenderoth, Lind & Ponack, LLP.

(57) ABSTRACT

Electronic paper 100 according to the present invention includes a first substrate 10 with first electrodes 14, a second substrate 20 with second electrodes 24, and a powder sheet structure 50 arranged between the first substrate 10 and the second substrate 20. The powder sheet structure 50 includes a bottom substrate 52 and a top substrate 54 opposed to each other, a dividing wall layer 56 including dividing walls 55 arranged between the bottom substrate 52 and the top substrate 54, and powder particles 30 enclosed between the adjacent dividing walls 55 in the dividing wall layer 56. The powder sheet structure is arranged so that the bottom substrate is opposed to the first electrodes of the first substrate, and that the top substrate is opposed to the second electrodes of the second substrate.

18 Claims, 20 Drawing Sheets

(56) References Cited

U.S. PATENT DOCUMENTS

2002/0080303 A1 6/2002 Izumi
2005/0001810 A1 1/2005 Yakushiji et al.
2006/0231401 A1 10/2006 Sakurai et al.

FOREIGN PATENT DOCUMENTS

| JP | 8-338972 | 12/1996 |
| JP | 11-277951 | 10/1999 |
| JP | 2001-312225 | 11/2001 |
| JP | 2002-139748 | 5/2002 |
| JP | 2003-167274 | 6/2003 |
| JP | 2003-202600 | 7/2003 |
| JP | 2003-322883 | 11/2003 |
| JP | 2005-17906 | 1/2005 |
| WO | 2004/055586 | 7/2004 |

OTHER PUBLICATIONS

International Search Report issued Apr. 12, 2011 in International (PCT) Application No. PCT/JP2011/000370.

* cited by examiner

ELECTRONIC PAPER AND METHOD FOR PRODUCING SAME

BACKGROUND

1. Technical Field

The present invention relates to electronic paper and a method for producing the same. More particularly, the present invention relates to a display device (electronic paper) capable of repeatedly displaying and erasing an image, for example, by movement of particles utilizing static electricity, and a manufacturing method of the same.

2. Background Art

As an image display device in place of a liquid crystal display device (LCD), there is proposed electronic paper using a technique such as an electrophoretic system and a particle movement system. In the electronic paper of the particle movement system, the movement of particles utilizing static electricity enables an image to be repeatedly displayed or erased. As compared with the LCD, the electronic paper has advantages of a wider view angle, which is close to that of a normal printed material, smaller power consumption, provision of a memory function and the like, thereby attracting attention as an inexpensive next-generation display device, as shown in Japanese Patent Laid-open Publication No. 2003-202600, Japanese Patent Laid-open Publication No. 2003-167274, WO 2004-055586.

FIG. 1 shows a constitution of electronic paper 1000 of a reference example of the particle movement system. The electronic paper 1000 shown in FIG. 1 includes substrates (110, 120) opposed to each other, at least one of which are transparent, and grid-like dividing walls 130 keeping an interval between both the substrates (110, 120). A cell structure is formed by both the substrates (110, 120) and the dividing walls 130, and inside a space of the cell structure, particles different in color (140A, 140B) are enclosed. As the interval between the substrate 110 and the substrate 120, a distance sufficient to allow the particles to move and to maintain contrast is selected.

SUMMARY OF THE INVENTION

The present inventor has considered electronic paper 2000 shown in FIG. 2, and found that there are problems below in actually manufacturing the electronic paper 2000.

First, a structure of the electronic paper 2000 shown in FIG. 2 will be described. The electronic paper 2000 includes a lower substrate 210, an upper substrate 220, and a grid-like dividing wall layer 230 interposed between both the substrates (210, 220).

The lower substrate 210 includes lower electrodes 214 formed on a surface of a lower sheet member 212, and an insulating layer 216 formed on the surface of the lower sheet member 212 so as to cover the lower electrodes 214. On the other hand, the upper substrate 220 constituting a display surface includes upper electrodes 224 formed on a surface of a transparent upper sheet member 222, and an insulating layer 226 formed on the upper sheet member 222 so as to cover the transparent upper electrodes 224. The grid-like dividing wall layer 230 includes a plurality of dividing walls 232, and a space between the adjacent dividing walls 232 is a cell space 250, and in the cell space 250, powder particles 240 (240A or 240B) are enclosed.

The dividing walls 232 of the grid-like dividing wall layer 230 have a role of holding a gap between the lower substrate 210 and the upper substrate 220. The dividing walls 232 are formed so as to extend vertically (perpendicularly) on the insulating layer 216 of the lower electrodes 214. An adhesion layer 234 is formed on upper surfaces of the dividing walls 232, and the dividing walls 232 are connected to the upper substrate 220 through the adhesion layer 234.

When a voltage (260) is applied to the lower electrodes 214 and the upper electrodes 224 in the electronic paper 2000, the powder particles 240 move inside the cell spaces 250, and the movement allows pixel display of the electronic paper 2000 to be performed. An example shown in FIG. 2 shows how the positively-charged powder particles 240A move to the lower electrode 214, and the negatively-charged powder particles 240B move to the upper electrodes 224, when the voltage is applied with the upper electrodes 224 used as positive electrodes and the lower electrodes 214 used as negative electrodes.

Next, referring to FIGS. 3A to 3E, a manufacturing method of the electronic paper 2000 will be described.

First, as shown in FIG. 3A, a substrate structure in which the lower electrodes 214 are formed on a surface of the lower sheet member 212 is prepared. Next, as shown in FIG. 3B, the insulating layer 216 is formed on the surface of the sheet member 212 so as to cover the lower electrode 214, and then, as shown in FIG. 3C, the grid-like dividing walls 232 are formed on the insulating layer 216.

Next, as shown in FIG. 3D, the powder particles 240 (240A, 240B) are put between the dividing walls 232, and then the adhesion layer 234 is formed on upper surfaces of the dividing walls 232. Subsequently, as shown in FIG. 3E, a transparent substrate structure (the upper substrate) made up of the transparent upper sheet member 222, the transparent upper electrodes 224, and the transparent insulating layer 226 is joined to the adhesion layer 234 of the dividing walls 232, thereby obtaining the electronic paper 2000.

Here, as shown in FIG. 4, when an insulating material is applied to the surface of the lower sheet member 212 with the lower electrodes 214 to thereby form the insulating layer 216, thickness irregularity (application irregularity) of the insulating layer 216 occurs, depending on a thickness of each of the lower electrodes 214. When the dividing walls 232 are formed on the surface of the insulating layer 216 in the state where the above-described thickness irregularity is present, as shown in FIG. 5, it is difficult to maintain accuracy of the dividing walls 232. Specifically, even though a central dividing wall 232a shown in FIG. 5 is accepted, dividing walls 232b, 232c extend obliquely, resulting in the inaccurate dividing walls 232.

In order to increase a display performance of the electronic paper, high definition in display density is necessary, and with the high definition, a high aperture ratio needs to be assured. The aperture ratio is expressed by an occupancy area ratio between powder-particle filling portions and the dividing walls 232, and the smaller the area occupied by the dividing walls 232 is, the higher the aperture ratio is. In order to assure the high aperture ratio, the grid-like dividing walls 232 tend to be miniaturized in dimension. As a result, the grid-like dividing walls 232 become thinner and higher, which increases difficulty level of forming (e.g., by adhesion or the like), without any defect, the dividing wall layer on the insulating layer 216 having irregularity attributed to the lower electrodes 214.

As shown in FIG. 6, even if the adhesion layer 234 is formed on upper surfaces of the inaccurate dividing walls (e.g., slanted dividing walls) 232b, 232c, the adhesion layer 234 cannot be formed successfully. Specifically, even if an adhesion layer formation roller 270 is moved (as indicated by an arrow 275) to form the adhesion layer 234 on the upper surfaces of the dividing walls 232, an adhesion layer 234a can be formed properly on the accurate dividing wall (dividing wall extending straight) 232a, while un-uniform adhesion layers 234b, 234c are formed on the upper surfaces of the dividing walls 232b, 232c extending obliquely.

Furthermore, as shown in FIG. 7, even when some (232b, 232c) of a number of dividing walls 232 have deficits or are bent, the substrate structure (the lower substrate with the dividing walls 232) is all defective and is discarded. As a result, because of the difficulty of forming a number of dividing walls 232 without any defect, an increase of the electronic paper 2000 in size has a technical limit and high difficulty.

If in order to suppress the thickness irregularity (application irregularity) of the insulating layer 216, the thickness of the lower electrodes 214 is made thinner, and costs will be higher than usual. That is, when the thickness of the lower electrodes 214 is desired to be thinner, forming a film by spattering or the like is required, which will bring about higher costs, as compared with a case where the lower electrodes 214 are formed of copper foil and the like. These higher costs will lead to an increase in costs of the electronic paper.

The present inventor has attempted to address the above-described problems in the dividing wall formation of the electronic paper 2000 not by extension of the related art but in a new direction to solve them. The present invention is achieved in light of the foregoing points, and a main object thereof is to provide a manufacturing method of electronic paper capable of facilitating an increase in size and highly-productive electronic paper.

The present invention provides electronic paper including: a first substrate with first electrodes; a second substrate arranged in opposition to the first substrate with second electrodes; and a powder sheet structure arranged between the first substrate and the second substrate, wherein the powder sheet structure includes: a bottom substrate and a top substrate opposed to each other; a dividing wall layer including dividing walls arranged between the bottom substrate and the top substrate; and powder particles enclosed between the adjacent dividing walls in the dividing wall layer, and the powder sheet structure is arranged so that the bottom substrate is opposed to the first electrodes of the first substrate, and that the top substrate is opposed to the second electrodes of the second substrate.

In the electronic paper, the first substrate and the second substrate may be each one substrate sheet, the powder sheet structures may be plurally arrayed two-dimensionally between the first substrate and the second substrate, and a gap may be provided between the powder sheet structures adjacent to each other.

Further, in the electronic paper, the gap may be filled with an adhesive. In addition, in the electronic paper, the adhesive with which the gap may be filled is softer than a material making the dividing walls.

Further, in the electronic paper, the gap may be filled with thermosensitive foamed particles.

In the electronic paper, the first electrodes in the first substrate include first pixel electrodes to move the powder particles inside the powder sheet structures, the second electrodes in the second substrate include second pixel electrodes to move the powder particles inside the powder sheet structures, on a side facing the powder sheet structures of surfaces of the first substrate, the first pixel electrodes are partially formed, and the side of the first substrate facing the powder sheet structures has a region where the first pixel electrodes are formed and a first pixel electrode absent region where the first pixel electrodes are not formed, on a side facing the powder sheet structures of surfaces of the second substrate, the second pixel electrodes are partially formed, and the side of the second substrate facing the powder sheet structures has a region where the second pixel electrodes are formed and a second pixel electrode absent region where the second pixel electrodes are not formed, and the gap located between the powder sheet structures is arranged, corresponding to at least one of the first pixel electrode absent region where the first pixel electrodes are not formed on the side of the first substrate facing the powder sheet structures, and the second pixel electrode absent region where the second pixel electrodes are not formed on the side of the second substrate facing the powder sheet structures.

Further, in the electronic paper, the top substrate of the powder sheet structure may be made of a transparent material.

Furthermore, in the electronic paper, the powder particles may include a plurality of types of particles for image display, and the dividing walls in the powder sheet structure may have a similar color to at least one color of the plurality of types of particles for image display, or a mixed color of the plurality of types of particles for image display.

Furthermore, in the electronic paper, the powder particles may include the plurality of types of particles for image display, and the bottom substrate of the powder sheet structure may have the similar color to at least one color of the plurality of types of particles for image display, or the mixed color of the plurality of types of particles for image display.

Further, in the electronic paper, the first substrate, the second substrate, and the bottom substrate and the top substrate in the powder sheet structure may be each made of a flexible substrate.

Furthermore, in the electronic paper, on outer circumferential surfaces of the bottom substrate and the top substrate in the powder sheet structure, adhesion layers may be formed, respectively, and the bottom substrate and the top substrate, and the first substrate and the second substrate are joined through the adhesion layers.

Further, in the electronic paper, in each of the first substrate and the second substrate, at least one side thereof has a dimension of 1 meter or more.

The present invention provides a manufacturing method of electronic paper, including the steps of: (a) preparing a first substrate with first electrodes; (b) arranging a plurality of powder sheet structures on the first substrate; and (c) arranging, on the plurality of powder sheet structures, a second substrate with second electrodes, and sandwiching the plurality of powder sheet structures between the first substrate and the second substrate, wherein each of the powder sheet structures includes: a bottom substrate and a top substrate opposed to each other; a dividing wall layer including dividing walls arranged between the bottom substrate and the top substrate; and powder particles enclosed between the adjacent dividing walls in the dividing wall layer, and each of the powder sheet structures is arranged so that the bottom substrate is opposed to the first electrodes of the first substrate, and that the top substrate is opposed to the second electrodes of the second substrate.

Further, in the manufacturing method of the electronic paper, in the step (b), an end portion of the dividing wall layer of the powder sheet structure facing a seam with the adjacent other powder sheet structure may be made of an end surface where at least a part of a space made by the dividing walls is opened, and the plurality of powder sheet structures may be arranged adjacently to one another.

Furthermore, in the manufacturing method of the electronic paper, in the step (b), alignment between the first substrate and the plurality of powder sheet structures may be executed with alignment marks used as references.

Further, in the manufacturing method of the electronic paper, in the step (b), the plurality of powder sheet structures may be arranged so that the seam between the powder sheet structures corresponds to an electrode absent region where the first electrodes in the first substrate are not formed.

Furthermore, in the manufacturing method of the electronic paper, in the step (c), the second substrate may be arranged so that the second electrode absent region where the second electrodes in the second substrate are not formed corresponds to the seam between the powder sheet structures.

Further, in the manufacturing method of the electronic paper, in the step (c), alignment between the second substrate and the plurality of powder sheet structures may be executed with alignment marks used as references.

Furthermore, in the manufacturing method of the electronic paper, in the step (b), the seam between the plurality of powder sheet structures may be filled with an adhesive.

According to the electronic paper of the present invention, the powder sheet structure arranged between the first substrate and the second substrate is included, and the powder sheet structure includes the bottom substrate and the top substrate, the dividing wall layer including the dividing walls arranged between the same, and the powder particles enclosed between the adjacent dividing walls. Consequently, the large-sized first substrate and second substrate, and the plurality of powder sheet structures can be used to construct large-sized electronic paper. Thus, an increase in size can be facilitated, and highly-productive electronic paper can be realized.

BRIEF DESCRIPTION OF THE DRAWINGS

The present invention will become readily understood from the following description of preferred embodiments thereof made with reference to the accompanying drawings, in which like parts are designated by like reference numeral and in which.

DETAILED DESCRIPTION OF THE PREFERRED EMBODIMENTS

Figure 1:
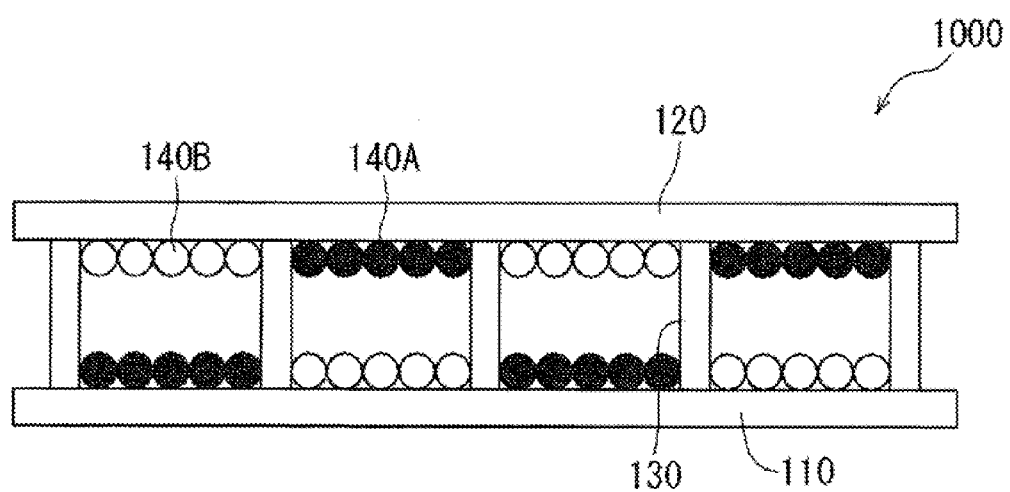
FIG. 1 is a cross-sectional view showing a constitution of electronic paper 1000 of a reference example.
Figure 2:
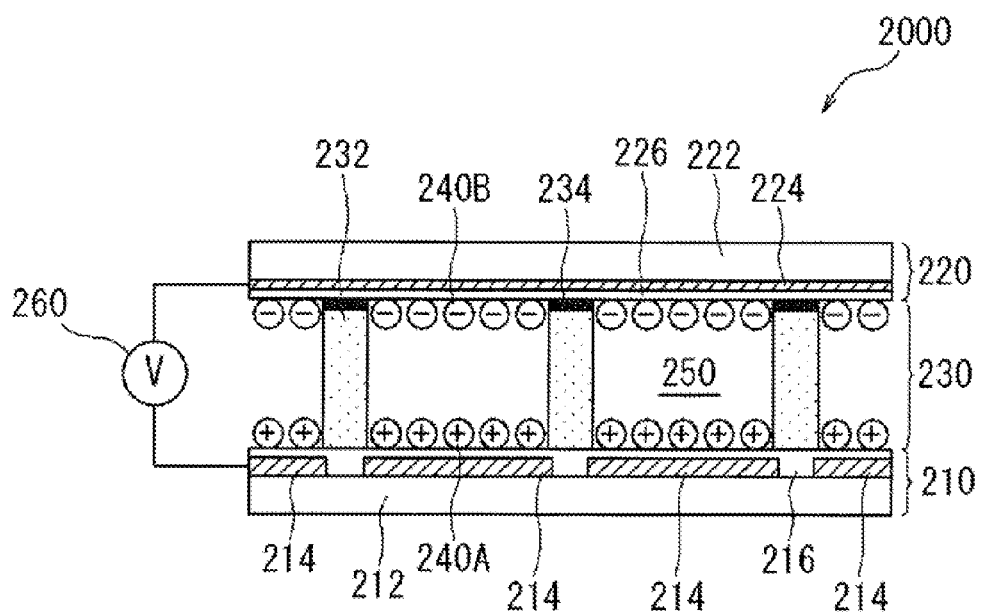
FIG. 2 is a cross-sectional view showing a constitution of electronic paper 2000.
Figure 3A:
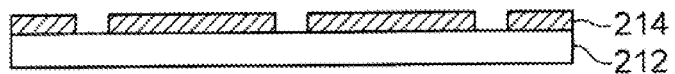
FIGS. 3A to 3E are process cross-sectional views for describing a manufacturing method of the electronic paper 2000.
Figure 3B:
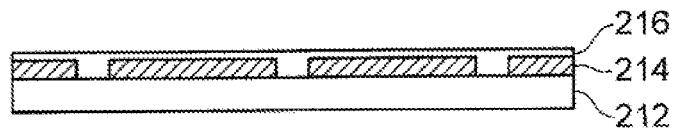
Figure 3C:
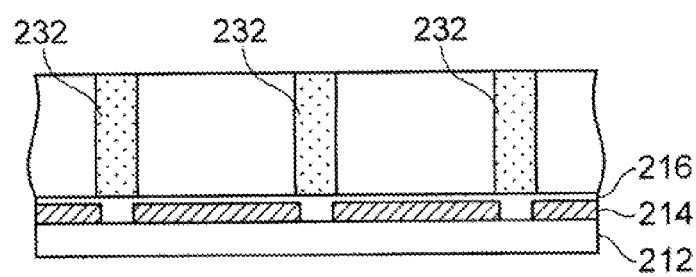
Figure 3D:
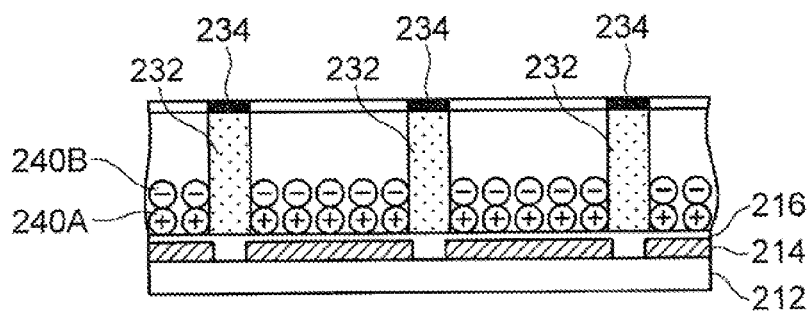
Figure 3E:
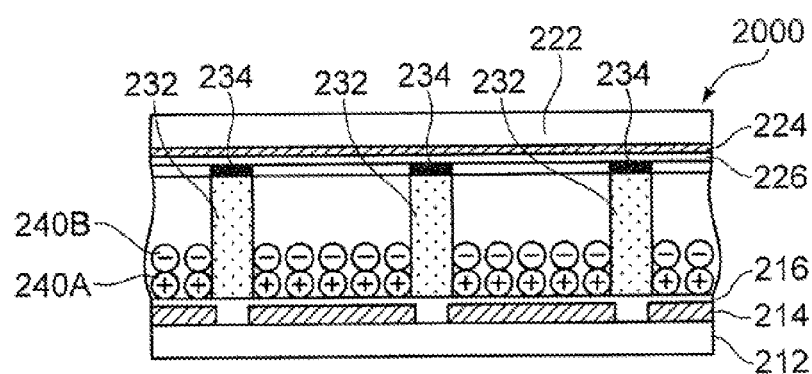
Figure 4:
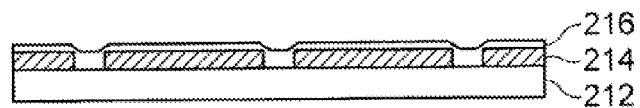
FIG. 4 is a process cross-sectional view for describing a problem in the manufacturing method of the electronic paper 2000.
Figure 5:
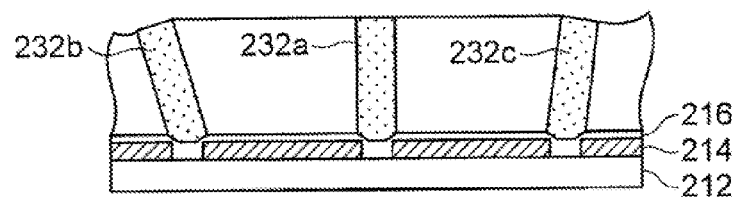
FIG. 5 is a process cross-sectional view for describing a problem in the manufacturing method of the electronic paper 2000.
Figure 6:
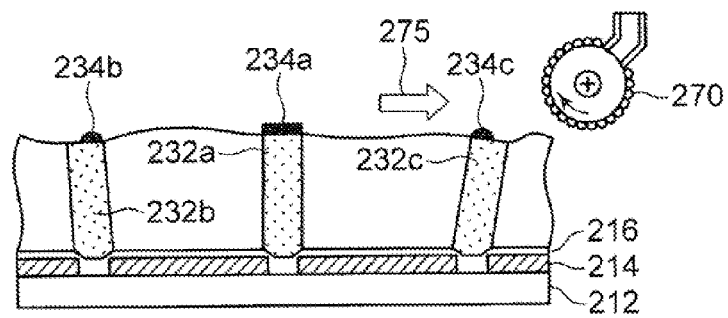
FIG. 6 is a process cross-sectional view for describing a problem in the manufacturing method of the electronic paper 2000.
Figure 7:
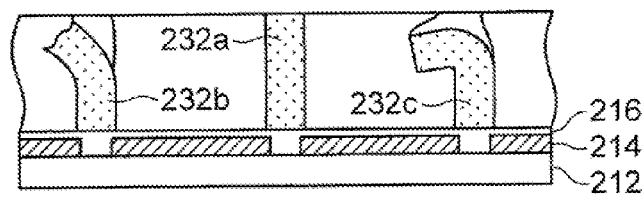
FIG. 7 is a process cross-sectional view for describing a problem in the manufacturing method of the electronic paper 2000.

Hereinafter, referring to the drawings, embodiments of the present invention will be described. In the following drawings, for simplification of descriptions, components having substantially the same functions are denoted by the same reference numerals. The present invention is not limited to the following embodiment.

Figure 8:
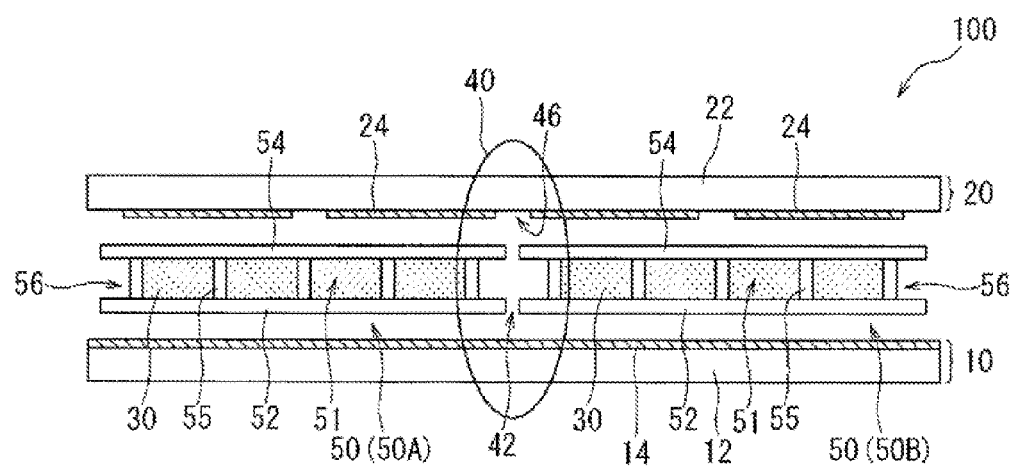
FIG. 8 is an exploded cross-sectional view schematically showing a constitution of electronic paper 100 according to an embodiment of the present invention.

FIG. 8 is an exploded cross-sectional view schematically showing a constitution of electronic paper 100 according to the embodiment of the present invention. The electronic paper 100 of the present embodiment includes a first substrate 10 on which first electrodes 14 are formed, a second substrate 20 on which second electrodes 24 are formed, and powder sheet structures 50 arranged between the first substrate 10 and the second substrate 20. Both or any one of the first substrate 10 and the second substrate 20 forming a display surface include(s) a transparent substrate(s) and electrodes.

In FIG. 8, to make it easy to understand the structure, the first substrate 10, the second substrate 20, and the powder sheet structures 50 are exploded to be displayed. The second substrate 20 is arranged in opposition to the first substrate 10. Moreover, the electronic paper 100 of the present embodiment has a structure in which the powder sheet structures 50 are sandwiched between the first substrate 10 and the second substrate 20.

Each one of the powder sheet structures 50 of the present embodiment includes a bottom substrate 52 and a top substrate 54 opposed to each other, and a dividing wall layer 56 including grid-like dividing walls 55 arranged between the bottom substrate 52 and the top substrate 54. Between the adjacent dividing walls 55 in the dividing wall layer 56, powder particles 30 are enclosed. In other words, the powder particles 30 are enclosed in cell spaces 51 surrounded by the bottom substrate 52, the top substrate 54 and the dividing walls 55. The powder particles 30 are electrically-charged particles for image display, and for example, obtained by coating spherical resin balls with carbon (black), titanium oxide (white) or the like. Properly selecting a material for coating allows the powder particles 30 to be colored in an arbitrary color. For example, when a black character or the like is displayed on a white ground, the powder particles 30 colored in white and black are mixed at a proper rate to be enclosed. Moreover, when a red character or the like is displayed on a yellow ground, the powder particles 30 colored in yellow and red are mixed to be enclosed. In this manner, a combination of colors desired to be displayed can be selected freely. A diameter and an enclosure amount of the above-mentioned powder particles 30 differ, depending on a design of display performance (e.g., a reflecting density and a shielding ratio) of the electronic paper 100. For example, the diameter of the powder particles may be about 2 to 500 µm. Moreover, for the enclosure amount, a proper filling amount may be selected in view of fluidity of the powder particles.

The first substrate 10 and the second substrate 20 of the present embodiment are each a substrate sheet. The first substrate 10 includes a first sheet member 12 having flexibility and the first electrodes 14 formed on a surface of the first sheet member 12. The first sheet member 12 is made of, for example, a PET (polyethylene terephthalate) or PEN (polyethylene naphthalate) film or the like. The first electrodes 14 are made of a conductive wiring material such as copper foil and aluminum foil.

Moreover, the second substrate 20 includes a second sheet member 22 having flexibility, and the second electrodes 24 formed on a surface of the second sheet member 22. When the second substrate 20 is a display surface side of the electronic paper 100, the second substrate 20 may be made of a transparent material. For example, the second sheet member 22 may be made of a transparent material (e.g., an optical PET (polyethylene terephthalate), or PET (polyethylene naphthalate) film). Moreover, the second electrodes 24 may be each made of a transparent electrode (e.g., an ITO film electrode, an IZO film electrode or the like). Moreover, when the second substrate 20 is the display surface side, the top substrate 54 in each of the powder sheet structures 50 may be made of a transparent material. Particularly, for the top substrate 54, an extremely-thin transparent film having a thickness of 4 to 5 µm is preferably used in view of maintenance of permeability and/or reduction in drive voltage.

The powder sheet structures 50 of the present embodiment are arrayed two-dimensionally between the first substrate 10 and the second substrate 20. In an example shown in FIG. 8, a cross section of a portion where the two powder sheet structures 50 (50A, 50B) are sandwiched by the first substrate 10 and the second substrate 20 is shown. For example, the two, three, four, or six (or more) powder sheet structures 50 can be arranged between the first substrate 10 and the second substrate 20.

In the example shown in FIG. 8, a gap 42 is provided between the powder sheet structures 50 (50A, 50B) adjacent to each other. The electronic paper 100 of the present embodiment has the structure in which the plurality of powder sheet structures 50 are sandwiched by the pair of substrates (10, 20), and a region 40 where this gap 42 exists increases flexibility or bendability. That is, the site of this gap 42 is a bent portion like a so-called joint, playing a role of helping the entire electronic paper 100 to be easily bent.

Moreover, the first electrodes 14 and the second electrodes 24 shown are the first pixel electrodes 14 and the second pixel electrodes 24. Moreover, the first pixel electrodes 14 and the second pixel electrodes 24 are arranged orthogonally to each other in an extending direction on the two substrates 10, 20 opposed to each other. Furthermore, regions where the first pixel electrodes 14 and the second pixel electrodes 24 cross make pixel regions to move the powder particles 30 in the powder sheet structure 50. That is, matrix pixel regions are made up. A potential difference between the first pixel electrodes 14 and the second pixel electrodes 24 allows the powder particles 30 in the pixel regions to move to the bottom substrate 52 side, or to move to the top substrate 54 side. The bottom substrates 52 and the top substrates 54 are each made of a dielectric material, and when a voltage is applied between the first pixel electrodes 14 and the second pixel electrodes 24, electric charges induced by the bottom substrates 52 and the top substrates 54 move the electrically-charged powder particles 30.

In the electronic paper 100 of the present embodiment, the gap 42 located between the adjacent powder sheet structures (50A, 50B) is arranged, for example, corresponding to a region 46 (a second electrode absent region) where the second pixel electrodes 24 of the second substrate 20 are not formed. In the gap 42 located between the powder sheet structures 50, the powder particles 30 for display are not included, and the region 40 where the gap 42 exists cannot be used as the pixel region. On the other hand, since the region 46 where the pixel electrodes (e.g., the second pixel electrodes 24) do not exist cannot be used as the pixel region, either, in the constitution of the present embodiment, the gap 42 is arranged so as to correspond to the region 46 where the pixel electrodes are not formed. If the gap between the adjacent powder sheet structures 50 and the region where the pixel electrodes 24 are formed overlap each other, a deficit of display information occurs. In the electronic paper of the present embodiment, as described above, the gap 42 between the adjacent powder sheet structures 50 (50A, 50B) is arranged, corresponding to the region 46 (second electrode absent region) where the second pixel electrodes 24 are not formed, which can prevent the above-described deficit of the display information from occurring. In the embodiment, for example, the region 46 where the second pixel electrodes 24 are not formed is provided in an electrode gap by design by partially changing the arrangement of the second pixel electrodes 24. However, when the electrode gap of the electrodes 24 is wider than the gap 42 between the powder sheet structures 50, obviously, the arrangement of the second pixel electrodes 24 need not be changed by design.

Figure 9:
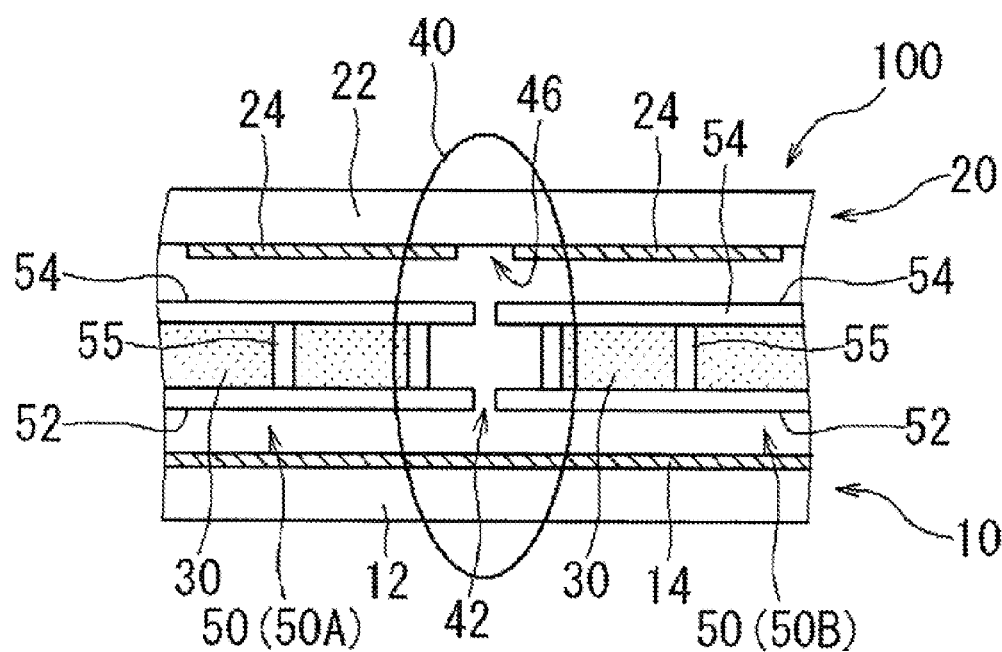
FIG. 9 is a cross-sectional view in which a vicinity of a gap 42 is enlarged.
Figure 10:
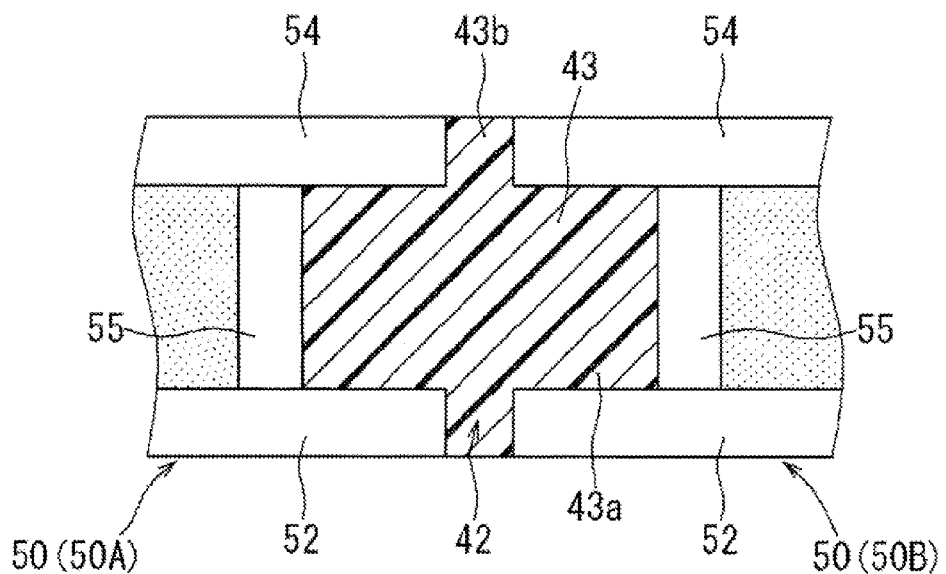
FIG. 10 is a cross-sectional view showing a constitution example in which the gap 42 is filled with an adhesive 43.

The region 40 where the gap 42 is located between the powder sheet structures 50 in the electronic paper 100 can also be constituted as follows. First, FIG. 9 is a cross-sectional view in which a vicinity of the gap 42 is enlarged. FIG. 10 shows a constitution example in which the gap 42 is filled with an adhesive 43.

In this example, the gap 42 between the adjacent powder sheet structures 50 (50A, 50B) is filled with the adhesive 43 to bond and fix both the powder sheet structures 50 (50A, 50B) to each other. The adhesive 43 can not only bond central portions (43a) of the powder sheet structures 50, but also bond the bottom substrates 52 or the top substrates (43b) to each other. Moreover, the adhesive 43 with which the gap 42 is filled allows the first substrate 10 and the second substrate 20, and the powder sheet structures 50 to be bonded in the vicinity of the gap 42.

Moreover, in view of holding flexibility of the electronic paper 100 by the gap 42, the adhesive 43 with which the gap 42 is filled is preferably softer than the material making the dividing walls 55. The adhesive 43 is made of, for example, a silicon adhesive resin, an urethane adhesive material or the like.

The dividing walls 55 are often made of a resin material with a relatively high hardness (e.g., acryl resin or epoxy resin). Here, when the entire electronic paper 100 is outlined like a plate, since only the resin material with the relatively high hardness exists at the sites of the dividing walls 55 (10 to 20% of the total), curvature or bending can be addressed as a whole.

However, when the gap 42 between the powder sheet structures 50 is filled with the adhesive 43, a strength when the electronic paper 100 is bent can be increased, as compared with a case where the gap 42 is not filled with the adhesive. Furthermore, when the electronic paper 100 is bent, a strength of the gap 42 where the dividing wall 55 does not exist is maintained only by the first substrate 10 and the second substrate 20. Therefore, when a bending stress repeatedly acts, there is a possibility that a crack of the substrates and disconnection of the electrodes with this and the like occur. Here, filling the gap 42 with the adhesive 43 can alleviate the above-described problem.

Figure 16A:
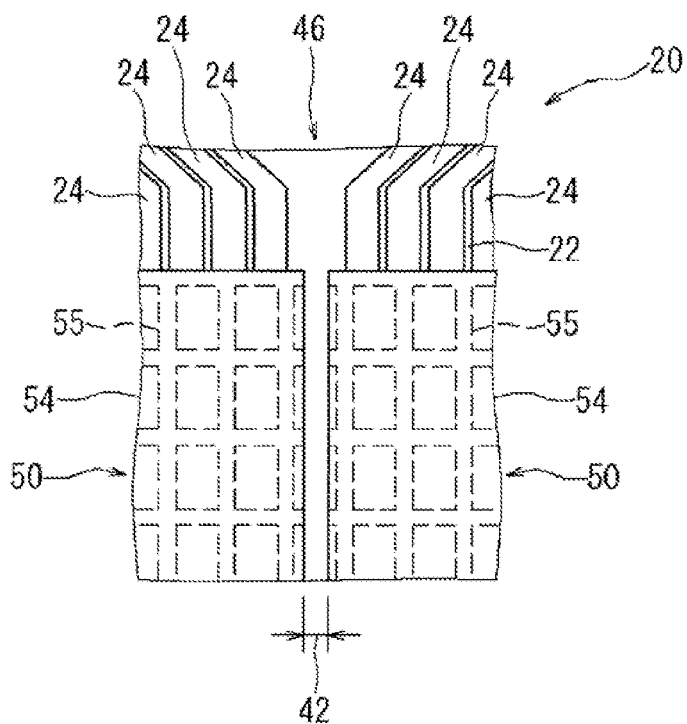
FIG. 16A is a plan view showing a relationship between electrodes 24 of a second substrate 20 and the powder sheet structures 50.
Figure 16B:
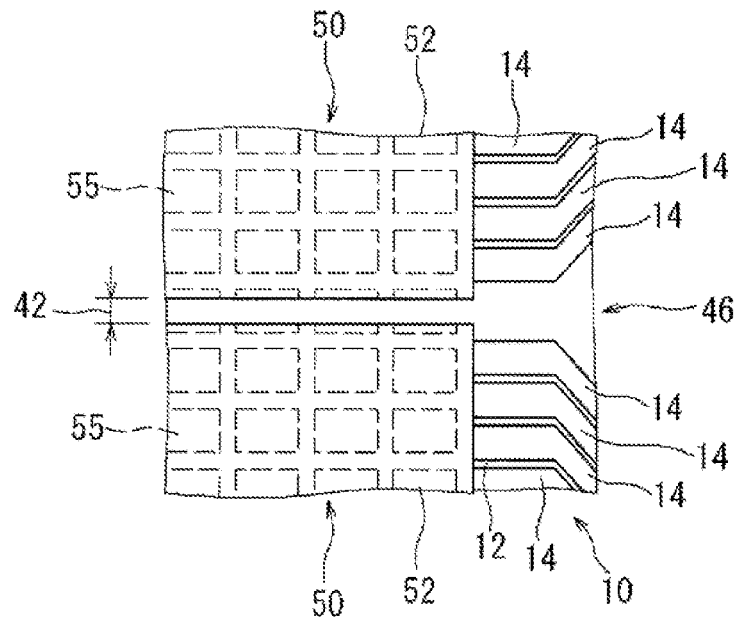
FIG. 16B is a plan view showing a relationship between electrodes 14 of a first substrate 10 and the powder sheet structures 50.

An end surface of the powder sheet structure 50 facing a seam with the adjacent other powder sheet structure 50 is constructed in a state where in a dividing wall layer 56 end portion, at least a part of the cell space made by the dividing walls 55 is opened as shown in FIG. 9 or FIGS. 16A and 16B, and the bottom substrate 52 and the top substrate 54 are projected, and a part of the cell space is exposed. Thus, when the gap 42 between the powder sheet structures 50 adjacent to each other is filled with the adhesive 43, the cell space in the open state is also filled with the adhesive. Accordingly, joining of the adjacent powder sheet structures 50 can be stabilized. Since this enables cutting at an arbitrary position of the plurality of cell spaces 51 in a fabrication process of the powder sheet structures 50, alleviation and change of cutting accuracy become easy and so on, which can contribute to an increase of productivity.

Moreover, as compared with a case where the gap 42 is filled with an adhesive with a hardness equivalent to, or higher than that of the members of dividing walls 55, it is more preferable to use an adhesive with a lower hardness. When the gap 42 is filled with the adhesive with the hardness equivalent to, or higher than that of the members of the dividing walls 55, the strength becomes higher than the strength of the dividing walls 55, which causes a possibility that the dividing wall 55 is destroyed (broken) in the vicinity of the gap 42, when the electronic paper 100 is bent. On the other hand, when the gap 42 is filled with a material softer than the material making the dividing walls 55, the above-described problem can be solved. As the adhesive 43 with which the gap 42 is filled, a relatively soft one is used to connect the powder sheet structures 50 and also connect the first substrate 10 and the second substrate 20, thereby enabling the strength to be maintained when the electronic paper 100 is bent. As a result, the expansion and contraction in the bonded portion can assure flexibility required as the large-sized electronic paper.

Figure 11:
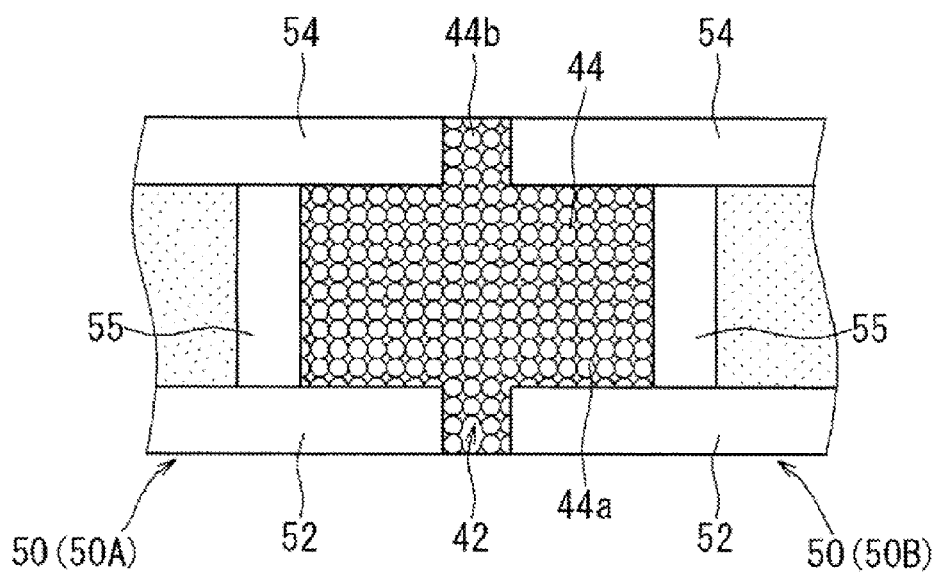
FIG. 11 is a cross-sectional view showing a constitution example in which the gap 42 is filled with thermosensitive foamed particles 44.

As shown in FIG. 11, the gap 42 may be filled with thermosensitive foamed particles 44. The thermosensitive foamed particles 44 are particles that are expanded when being heated. As the thermosensitive foamed particles 44, for example, thermosensitive microcapsules can be used. The thermosensitive microcapsules are capsules each encompassing low-boiling liquid carbon hydride with a thermoplastic polymer shell, and when being heated, the polymer shell is softened, the liquid carbon hydride inside the shell is changed into gas, and a pressure thereof expands the capsule.

In the case where the gap 42 is filled with the thermosensitive foamed particles 44, there is an advantage that control is easier than that of the filling with the adhesive 43. Further, when the gap 42 is filled with the adhesive 43, particularly, the softer adhesive 43 than the dividing walls 55, extrusion of the adhesive 43 or flowing around to the respective electrode surfaces of the first substrate 10 and the second substrate 20 need to be prevented. In this case, an amount of the adhesive when filling is required to be strictly managed. On the other hand, in the case where the thermosensitive foamed particles 44 are used in the process in which the gap 42 is filled with the adhesive 43, the thermosensitive foamed particles 44 expand by being heated, thereby enabling the gap 42 to be filled with ease and for sure.

That is, the adhesive 43 mixed with a proper amount of thermosensitive foamed particles 44 (management for a strict amount is not required) is applied to the gap 42 in advance to bond the powder sheet structures 50, and the first substrate 10 and the second substrate 20. Heating at the time of bonding or at the time of annealing treatment after the bonding allows the thermosensitive foamed particles 44 to be foamed, thereby enabling the gap 42 between the powder sheet structures 50 to be filled without any clearance.

The thermosensitive particles 44, being mixed with the adhesive, connect the powder sheet structures 50, and also connect the first substrate 10 and the second substrate 20. Moreover, the thermosensitive foamed particles 44 have air bubbles, thereby assuring the flexibility in the bonded portion. Moreover, since heating and foaming are performed after the powder sheet structures 50, and the first substrate 10 and the second substrate 20 are bonded, the adhesive 43 can be easily prevented from being extruded and flowing around to the respective electrode surfaces of the first substrate 10 and the second substrate 20.

Next, referring to FIGS. 12 to 16, the electronic paper 100 of the present embodiment will be described in detail.

Figure 12:
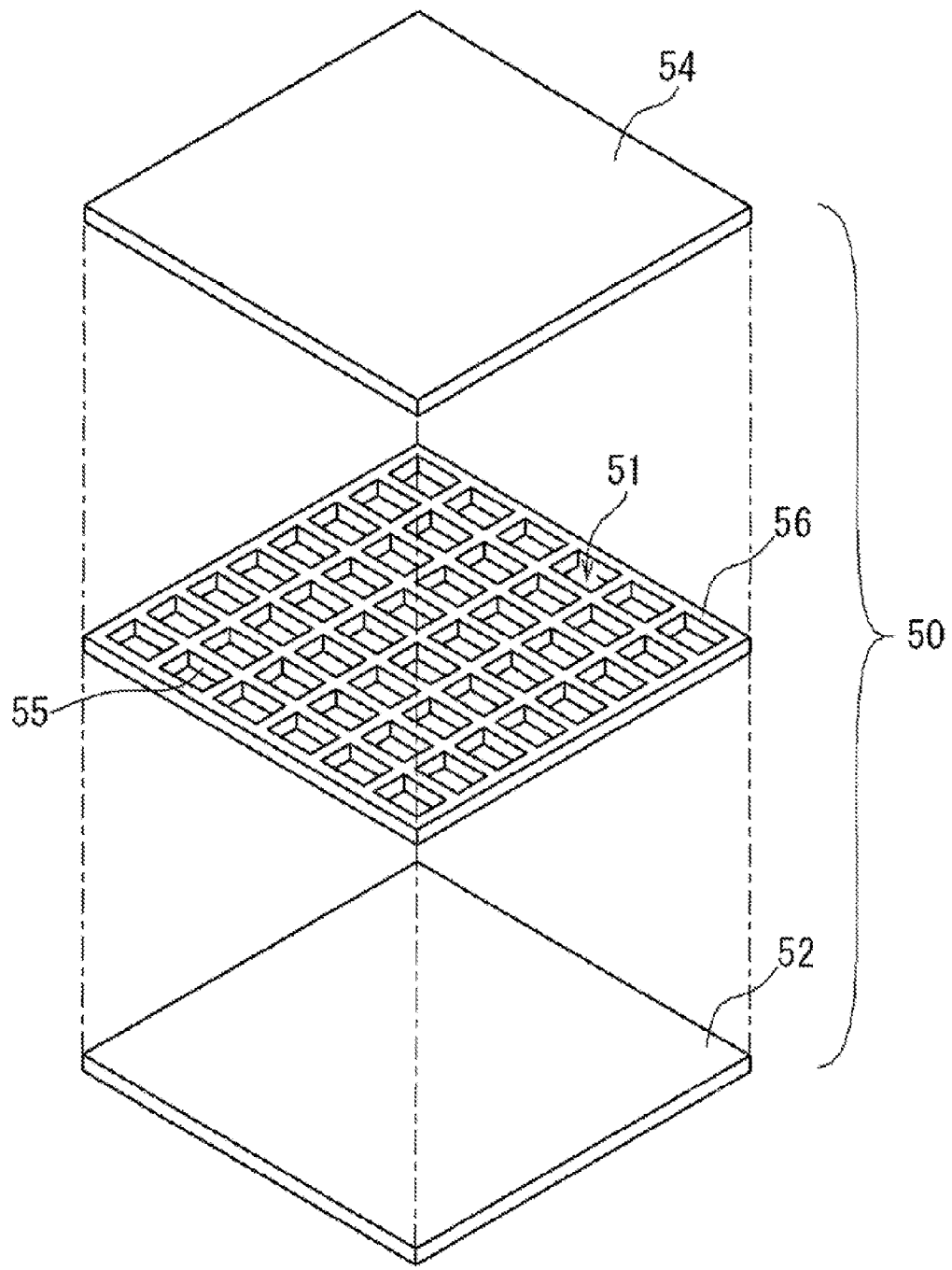
FIG. 12 is an exploded perspective view of a powder sheet structure 50.

FIG. 12 is an exploded perspective view for describing the constitution of the powder sheet structure 50 of the present embodiment. As shown in FIG. 12, the powder sheet structure 50 has the structure in which the dividing wall layer 56 including the plurality of cell spaces 51 defined by the dividing walls 55 extending in a grid is sandwiched by the bottom substrate 52 from below and the top substrate 54 from above. The cell spaces 51 of the dividing wall layer 56 are filled with the powder particles 30.

In this example, a pitch of the cell spaces 51 is, for example, about 0.5 µm to about 1 mm. A thickness of the dividing wall layer 56, that is, a height of the dividing walls 55 is, for example, 40 to 50 µm. Moreover, a width of the dividing walls 55, that is, a thickness of the dividing walls 55 themselves is, for example, about 5 to 50 µm in order to assure a maximum aperture, which is desirably as narrow as possible. The pitch of the cell spaces 51 and the height and the width of the dividing walls are selected properly as needed in view of a size of display pixels, display performance and the like.

Moreover, a length of one side of the dividing wall layer 56 (or the bottom substrate 52 or the top substrate 54) is, for example, 10 to 30 cm. However, the above-described dimension of the dividing wall layer 56 is arbitrarily decided as needed, and for example, the dividing wall layer 56 can be created by cutting into a necessary size from the dividing wall layer 56 in an optimal productive size prepared in advance. Moreover, as to a shape of the dividing wall layer 56, a square, a rectangle, a triangle, a hexagon and the like can be selected as needed in accordance with a work method and an arrangement method. Although one side of the dividing wall layer 56 can have a larger dimension, the dividing wall layer 56 is preferably, for example, a 30 cm×30 cm square piece, and an A4 size piece in view of the productivity on the manufacturing (e.g., maintenance of accuracy and handling properties).

Figure 13:
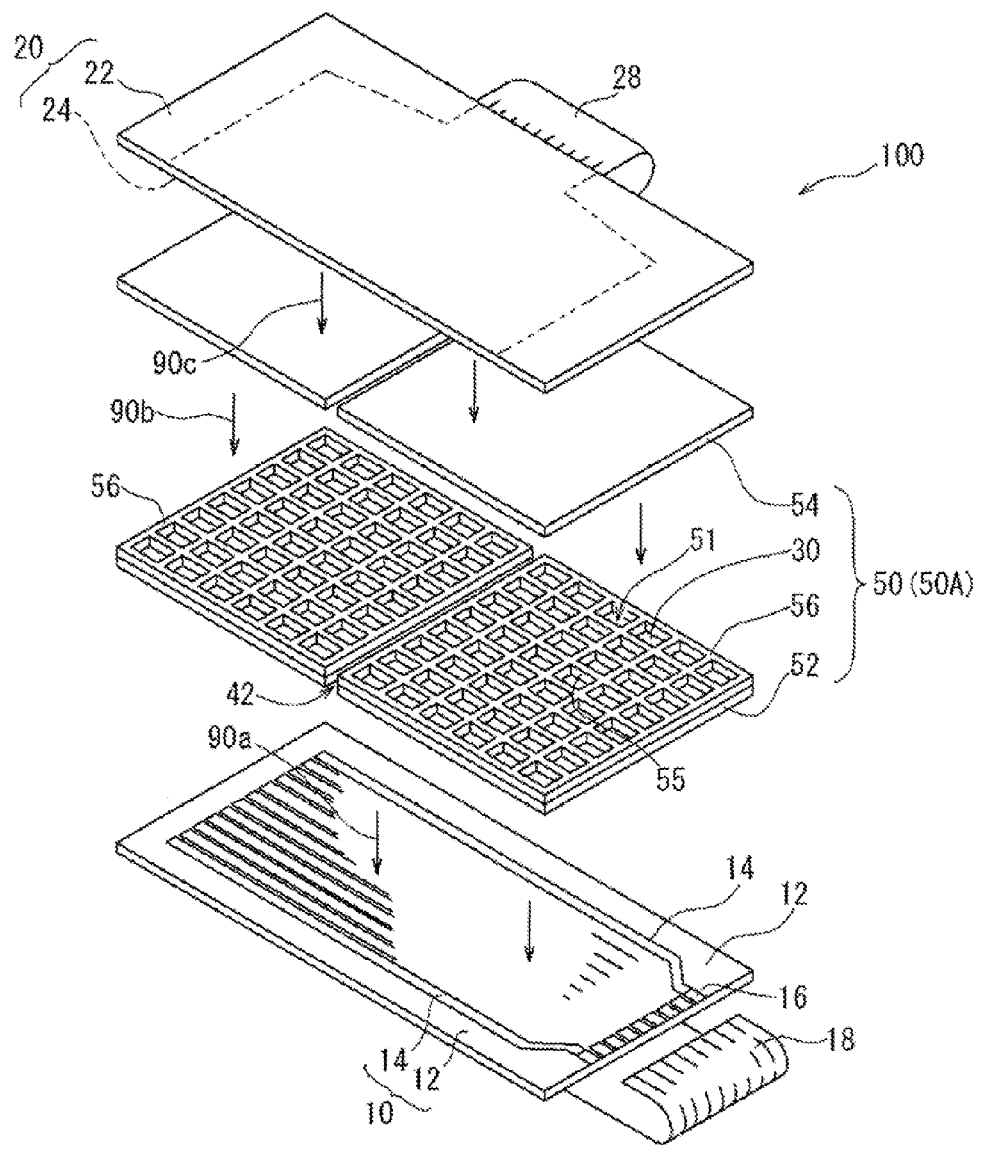
FIG. 13 is an exploded perspective view of the electronic paper 100 including the two powder sheet structures 50.

FIG. 13 is an exploded perspective view for describing a constitution of the electronic paper 100 including the two powder sheet structures 50 (50A). Referring to FIG. 13, a manufacturing method of the electronic paper 100 of the present embodiment will be described.

First, the first substrate (lower substrate) 10 with the first electrodes 14 is prepared. Here, the first electrodes 14 are pixel electrodes, and are formed on the sheet member 12. In this example, the first electrodes 14 are strip electrodes extending corresponding to the pixel regions. Moreover, the first electrodes 14 are connected to terminals 16 provided in an end region of the sheet member 12, and the terminals 16 are electrically connected to an external connection terminal 18.

Next, the plurality of powder sheet structures 50 separately manufactured are arranged on the first substrate 10 (refer to an arrow 90*a*). Here, although the powder sheet structures 50 are shown in an exploded state, the powder sheet structures 50 are in the form in which the dividing wall layer 56 is sandwiched by the bottom substrate 52 and the top substrate 54. The dividing wall layer 56 includes the plurality of cell spaces 51 defined by the dividing walls 55 extending in a matrix (or in a grid), and the cell spaces 51 are filled with the powder particles 30. Specifically, after the bottom substrate 52 is joined to a bottom surface of the dividing wall layer 56, the cell spaces 51 are filled with the powder particles 30, and subsequently, an upper surface of the dividing wall layer 56 is shut by the top substrate 54 (refer to an arrow 90*b*). As described above, the powder sheet structures 50 can be obtained.

Moreover, the method for manufacturing the powder sheet structures 50 is not limited to the method of constructing the powder sheet structures 50 by bonding the dividing wall layer 56, the bottom substrate 52 and the top substrate 54, which have been separately manufactured. For example, as a method for forming the dividing wall layer 56, the dividing wall layer 56 made of a photoresist material can also be formed by bonding the photoresist film and the like, having self-adhesiveness to the bottom substrate 52 and then, forming a grid-like pattern by photolithography, and subsequently etching. Furthermore, using a resin material and a printing technique, the dividing wall layer 56 can also be directly formed on the bottom substrate 52. In this manner, the dividing wall layer 56 difficult in accuracy management and handling can be prepared in a separate process in place of forming directly on the first and second substrates with the pixel electrodes formed as in the related art, which facilitates the manufacturing of the dividing wall layer 56. According to the manufacturing method of the electronic paper of the present embodiment, only using the good-quality powder sheet structures 50 with dividing wall layer 56 having no defect, the first substrate 10 and the second substrate 20, the electronic paper can be assembled. This makes it unnecessary to discard the entire electronic paper including even the first substrate 10 with the occurrence of a defect in the dividing wall layer 56, which has conventionally been a problem. Moreover, even if any defect occurs in a part of the dividing wall layer 56 when the powder sheet structures 50 are manufactured, only the defective portion is removed, which enables reuse of the dividing wall layer 56 without discarding the same. This can contribute to assurance of higher productivity and reduction in production costs.

Among the powder particles 30 with which the cell spaces 51 of the powder sheet structures 50 are filled, only the powder particles 30 in portions to which a voltage is applied in the pixel regions where the first electrodes 14 and the second electrodes 24 cross move inside the cells. Thus, each of the pixel regions and each of the cell spaces 51 defined between the adjacent dividing walls do not necessarily correspond to each other in position. Accordingly, since the dividing walls merely function as spacers, normally, positioning between the first electrodes 14 of the first substrate 10 and the dividing walls 55 inside the dividing wall layer 56 of the powder sheet structure 50 is not required. However, in a special case, such as a case where the adjacent cell spaces 51 are arranged and filled with the powder particles in different colors and the like, the positioning between the first electrodes 14 of the first substrate 10 and the dividing walls 55 inside the dividing wall layer 56 of the powder sheet structure 50 is required so as to correspond to the respective pixel regions. In this case, the powder sheet structure 50 is positioned and arranged on the first electrodes 14 of the first substrate 10 so that the cell spaces 51 inside the dividing wall layer 56 of the powder sheet structure 50 correspond to the first electrodes 14 in position.

After the plurality of powder sheet structures 50 are arrayed on the first electrodes 14 of the first substrate 10, the second substrate (upper substrate) 20 in which the second electrodes 24 is formed is arranged on the plurality of powder sheet structures 50. In this case, a side of the second substrate 20 where the second electrodes 24 are formed is arranged so as to face the powder sheet structures 50. This allows the powder sheet structures 50 to be sandwiched by the first substrate 10 and the second substrate 20. Moreover, the second substrate 20 is arranged above the first substrate 10 so that the first electrodes 14 of the first substrate 10 and the second electrodes 24 of the second substrate 20 are orthogonal to each other in the extending direction (refer to an arrow 90*c*). Here, the second electrodes 24 are the second pixel electrodes, and are formed on the sheet member 22 (in the figure, on a back surface of the sheet member 22). In this example, the second electrodes 24 are strip electrodes extending corresponding to the pixel regions. Moreover, the second electrodes 24 are electrically connected to external connection terminals 28 provided in an end region of the sheet member 22.

In this manner, the first substrate 10, the plurality of powder sheet structures 50, and the second substrate 20 are layered and bonded, by which the electronic paper 100 of the present embodiment can be completed.

Figure 14:
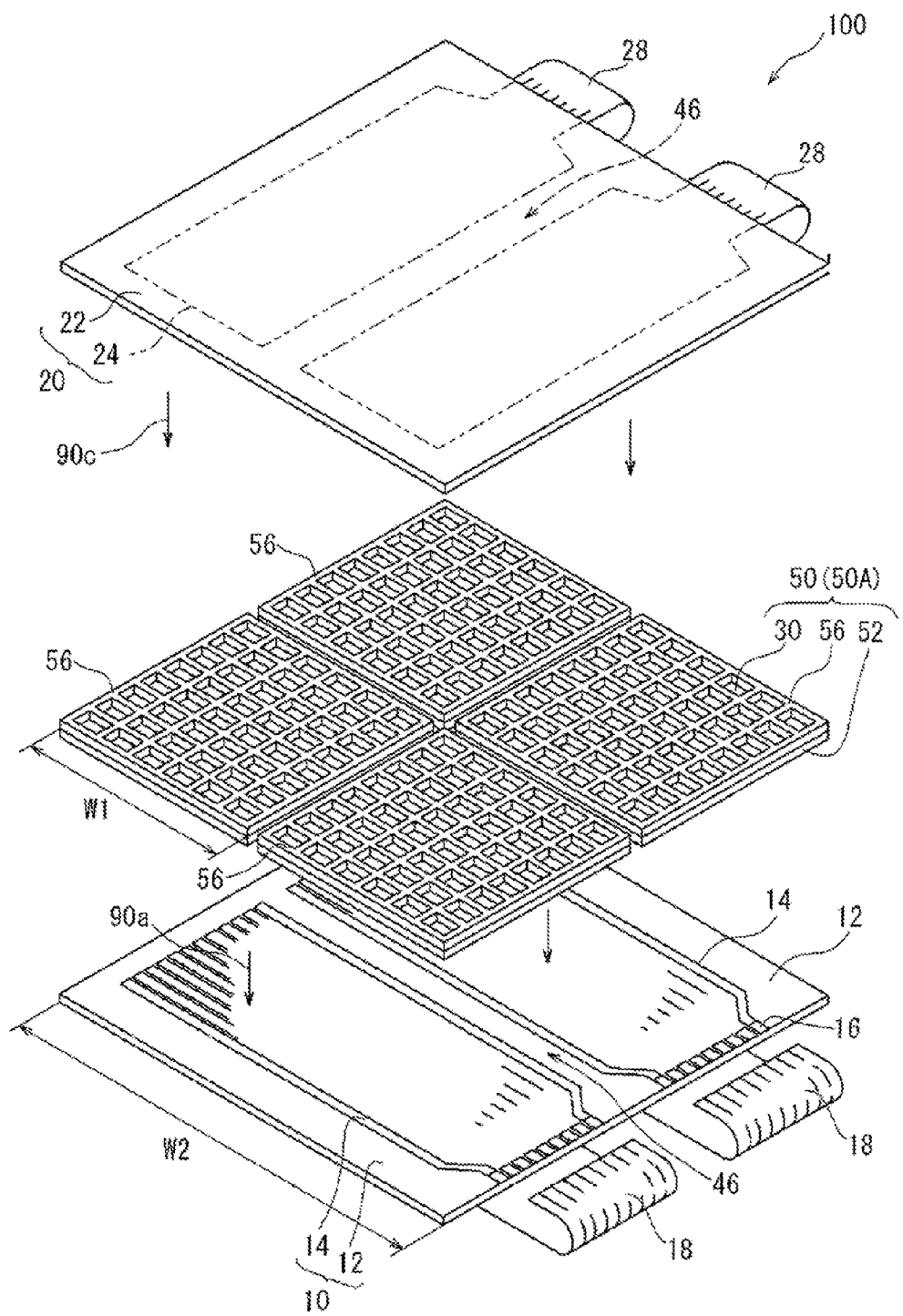
FIG. 14 is an exploded perspective view of the electronic paper 100 including the four powder sheet structures 50.

FIG. 14 is an exploded perspective view for describing a constitution of the electronic paper 100 including the four powder sheet structures 50 (50A). In FIG. 14, the top substrate 54 is omitted.

In this example, a constitution in which the four powder sheet structures 50 are arrayed is shown. While a length W1 of one side of the powder sheet structure 50 is, for example, 30 cm, it can be made shorter or longer than this, and a preferable length can be employed as needed. While in FIG. 14, the constitution in which the four powder sheet structures 50 are arrayed is shown, the six powder sheet structures 50 or nine powder sheet structures 50 can be arrayed by the similar technique. Since the powder sheet structures 50 can be manufactured in a separate process in advance to be prepared, only the powder sheet structures confirmed as good-quality ones in inspection can be arrayed on the first substrate 10. In addition, when the electronic paper 100 of a large screen is manufactured, a necessary number of powder sheet structures 50 only need to be arrayed, which alleviates the difficulty of the manufacturing with an increase of the screen in size.

Moreover, as to the powder sheet structure 50 to be arrayed, for example, in the case where a black character or the like is displayed on a white ground, the powder sheet structure 50 in which the powder particles colored in white and black are enclosed is used. For example, in the case where a red character or the like is displayed on a yellow ground in a part of the display, and so on, the powder sheet structure 50 in which the powder particles colored in yellow and red are enclosed is prepared to be fitted and arranged in a portion where the display is required. In this manner, a combination and a layout of colors to be displayed can be freely selected. Similarly, the powder sheet structures 50 different in density of the dividing walls 55 of the dividing wall layer 56, and the powder sheet structure 50 in which a complicated fixing pattern, such as a logo mark difficult to display in a matrix, is formed can be freely arranged.

Accordingly, there are not only an advantage that variation of the display becomes abundant, but also an advantage that modification and customization can be easily performed.

Figure 15:
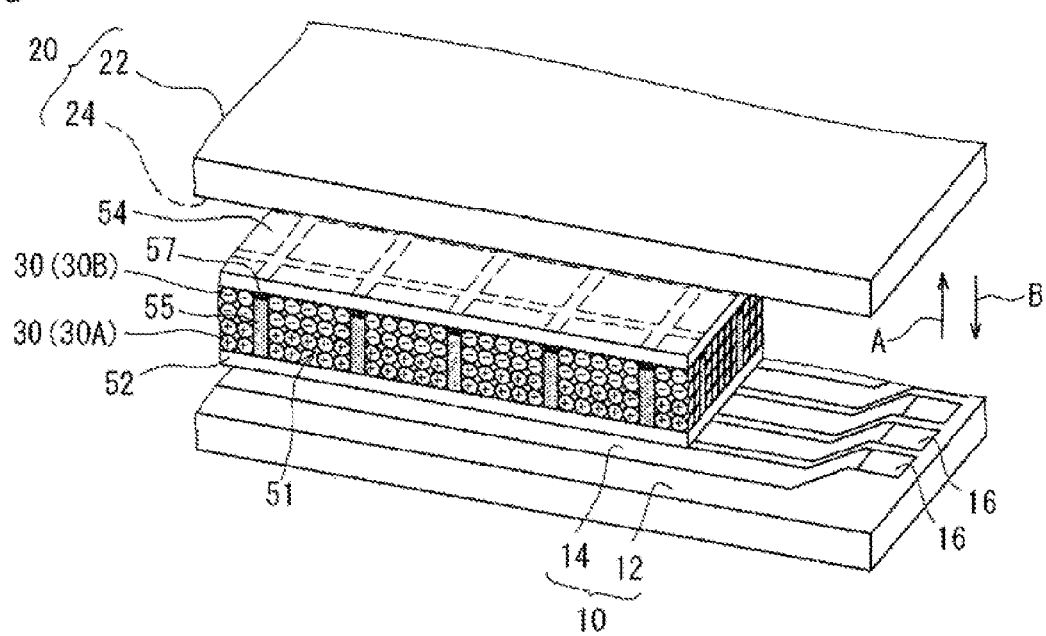
FIG. 15 is an exploded perspective view showing an enlarged vicinity of the powder sheet structure 50.

FIG. 15 is a perspective view schematically showing how the powder sheet structure 50 is arranged on the first substrate 10. FIG. 15 shows how the respective cell spaces 51 of the dividing wall layer 56 of the powder sheet structure 50 are filled with the powder particles 30 (30A, 30B). The cell spaces 51 surrounded by the dividing walls 55 are filled with the powder particles 30, while the cell spaces in the open state each exposed at the seam with the adjacent other powder sheet structure 50 are not filled with the powder particles 30. Moreover, the dividing walls 55 are joined to the top substrate 54 through an adhesion layer 57.

In the electronic paper 100 of the present embodiment, the seam between the adjacent powder sheet structures 50 is preferably arranged, corresponding to the region (electrode absent region) where the electrodes (especially, the pixel electrodes) are not formed. Here, FIG. 16A is a part of a plan view in an arrow A direction in FIG. 15, and FIG. 16B is a part of a plan view in an arrow B direction in FIG. 15.

As shown in FIG. 16A, the seam (gap) 42 between the adjacent powder sheet structures 50 is arranged, corresponding to the region 46 (electrode absent region) in the second substrate (upper substrate) 20 where the second electrodes (pixel electrodes) 24 are not formed. On the other hand, as shown in FIG. 16B, the seam 42 between the adjacent powder sheet structures 50 is arranged, corresponding to the region 46 (electrode absent region) in the first substrate (lower substrate) 10 where the first electrodes (pixel electrodes) 14 are not formed. Since the above-described region 46 where the electrodes 14, 24 are not formed (electrode absent region) is a non-display region, causing the seam 42 between the adjacent powder sheet structures 50 to correspond to this region 46 can suppress a decrease in image quality due to the seam 42.

When the powder sheet structures 50 are arrayed while causing the seam 42 of the powder sheet structures 50 to correspond to the electrode absent region 46, the array can be executed with alignment marks used as references. The alignment marks may be provided at a predetermined position of each of the powder sheet structures 50, at a predetermined position of the first substrate 10, and at a predetermined position of the second substrate 20. In the case where the alignment mark is provided in the powder sheet structure 50, the alignment mark may be written in a body of the powder sheet structure 50, and, however, the alignment mark may also be written in a support film used when the powder sheet structure 50 is handled.

Figure 17:
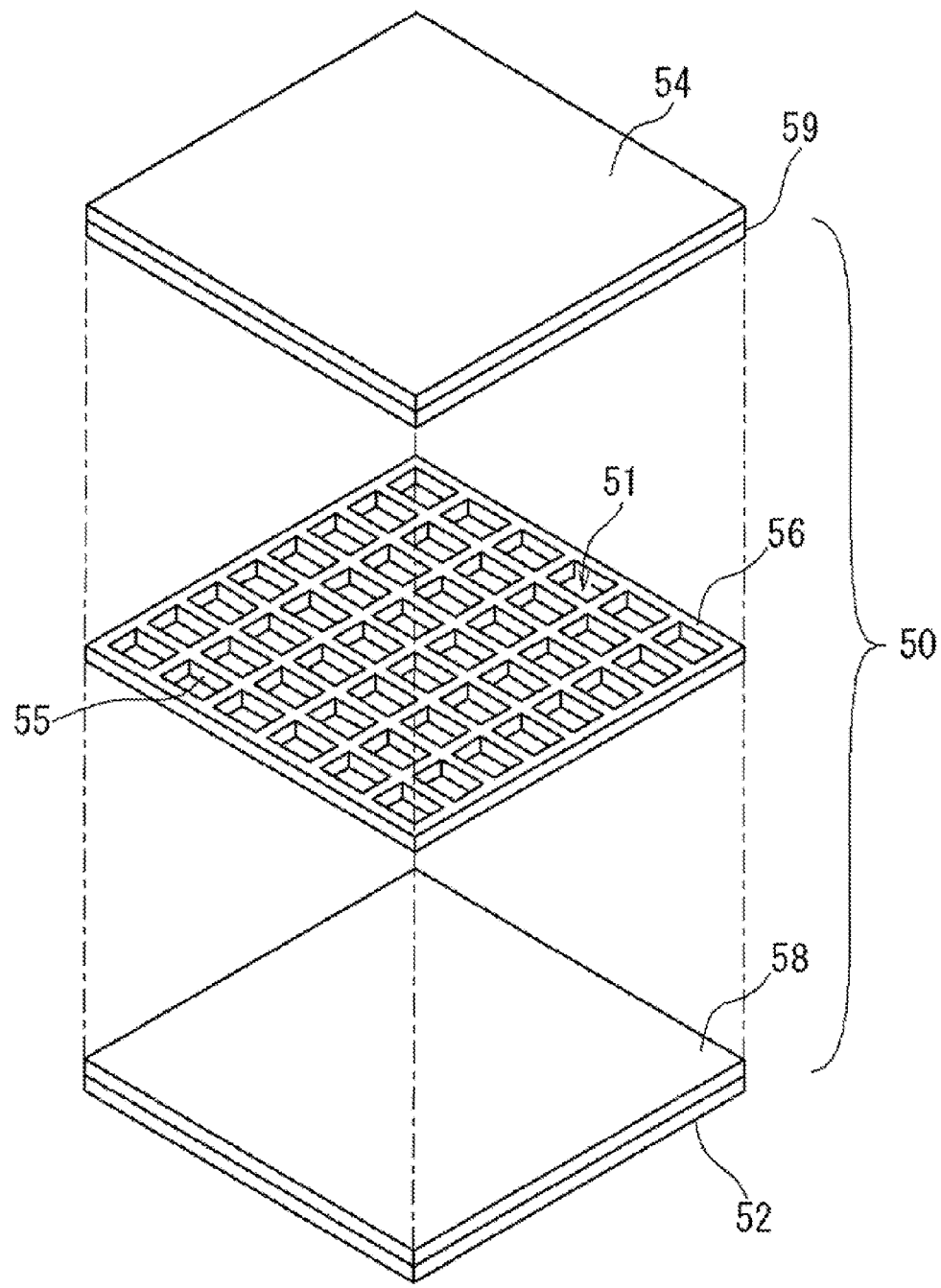
FIG. 17 is an exploded perspective view showing a modification of the powder sheet structure 50.

Next, referring to FIG. 17, a modification of the powder sheet structure 50 of the present embodiment will be described. FIG. 17 is an exploded perspective view showing a modification of the powder sheet structure 50 of the present embodiment.

FIG. 17 shows a form in which an adhesion layer 58 is layered on an upper surface of the bottom substrate 52, and on the other hand, an adhesion layer 59 is layered on a lower surface of the top substrate 54. According to this constitution, only sandwiching the dividing wall layer 56 including the dividing walls 55 by both of the bottom substrate 52 and the top substrate 54 allows a layering process to be executed. In this case, attachment of the powder particles 30 with which the dividing wall layer 56 is filled to the adhesion layers 58 and 59 can be prevented by selecting a nonviscous adhesive material or an adhesive that completes the adhesion by reacting with a reactant applied on the dividing walls 55 in advance. In order to bond the bottom substrate 52 and the top substrate 54 to the dividing wall layer 56, the process can also be modified to a process of applying, for example, the non-viscous hot-melt adhesion layer 58 to the upper surface of the dividing wall layer 56.

The end portion of the dividing wall layer 56 of the powder sheet structure 50 facing the seam with the adjacent other powder sheet structure 50 is made of the end surface where at least a part of the cell space made by the side walls 55 is opened, as shown in FIG. 9. Thus, in the end portion of the dividing wall layer 56, the bottom substrate 52 and the top substrate 54 are projected, and a part of the portion corresponding to the cell space is exposed in the open state, and when the gap 42 is filled with the adhesive 43, the cell space in the open state is also filled with the adhesive 43. This can stabilize the joining between the adjacent powder sheet structures 50. Moreover, since in a fabrication stage of the powder sheet structures 50, the cutting can be performed at an arbitrary position, alleviation and change of cutting accuracy become easy and so on, which can contribute to an increase of productivity.

Figure 18:
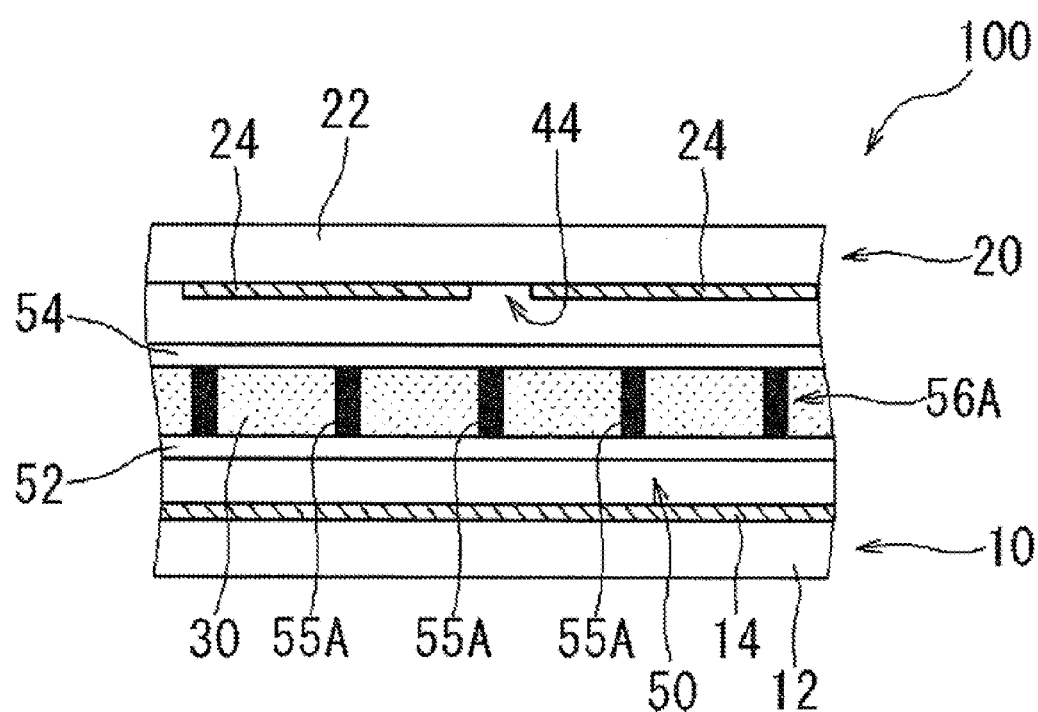
FIG. 18 is a cross-sectional view showing a modification of the electronic paper 100.

Moreover, the following modification can be made. FIG. 18 is an exploded cross-sectional view showing a modification of the electronic paper 100 of the present embodiment. In the modification shown in FIG. 18, in order to increase visibility of the electronic paper 100, that is, in order to improve contrast around the display pixels and cause the display pixels (an image) to stand out, and assure display surface uniformity at the nondisplay time (on a solid screen), coloring is applied to the dividing walls 55 in the dividing wall layer 56A.

Specifically, a color of dividing walls 55A can be similar to at least one color of the powder particles (particles for image display) 30, or can be a mixed color of the powder particles 30. For example, when the powder particles 30 include black particles and white particles, the dividing walls 55A can be colored in any one of black, white and gray. Which coloring is to be performed may be properly selected as needed, depending on a use condition, a design condition and the like of the electronic paper 100. Moreover, when the powder particles 30 are made of only black particles, the dividing walls 55A can be colored in the relevant color (black).

In addition, when the powder particles 30 include black particles, white particles, and particles in a color other than the same (e.g., red particles), the dividing walls 55A can be colored in any one of black, white, gray, red, and a mixed color of black, white and red. In order to select and display the powder particles in the three colors, particles different in electric charge (e.g., ++particles, +particles, −particles) may be used for filling, and a voltage applied between the substrates 10 and 20 may be varied to display any one of black, white, and red.

Figure 19:
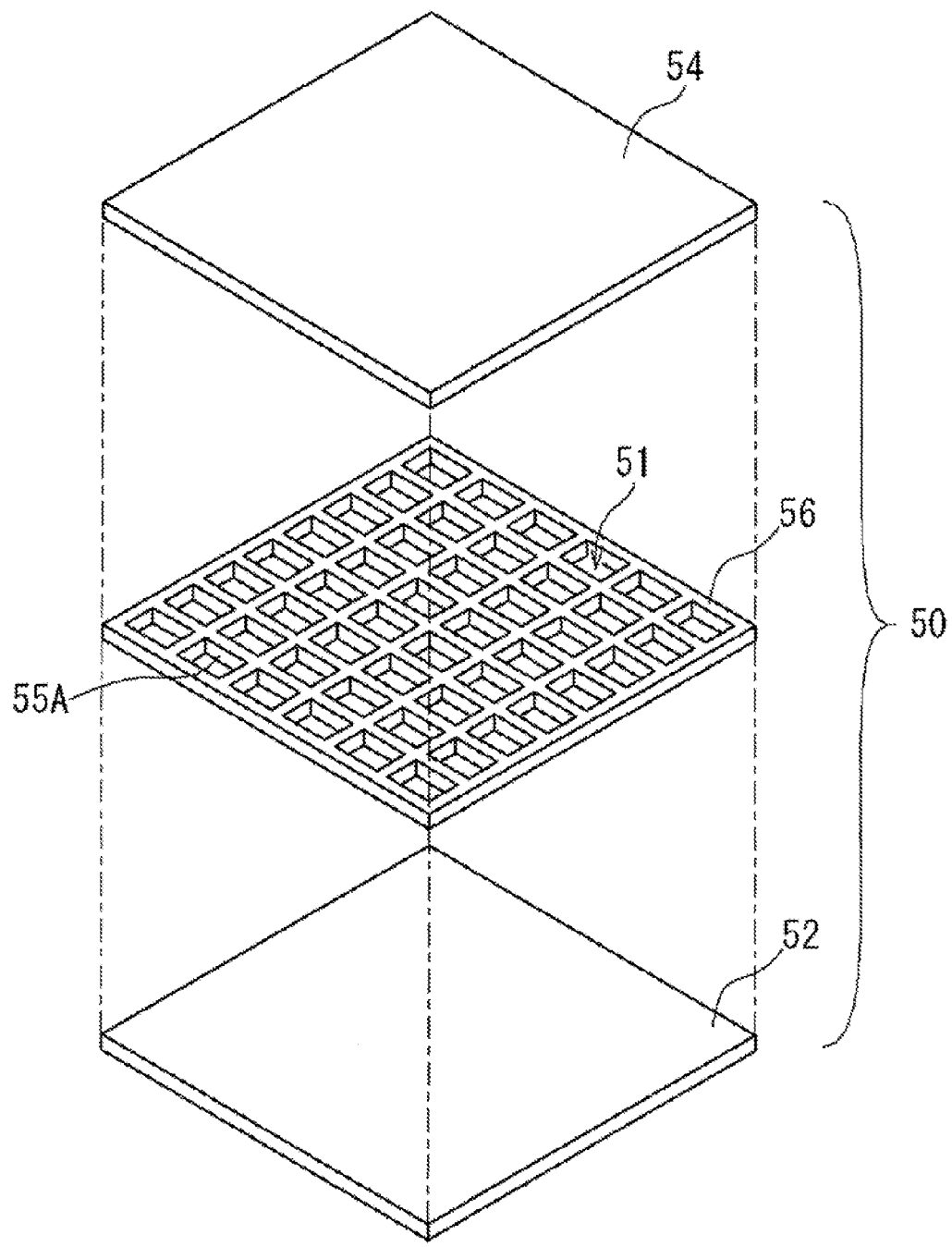
FIG. 19 is an exploded perspective view showing the modification of the powder sheet structure 50.

FIG. 19 is an exploded perspective view of the powder sheet structure 50 shown in FIG. 18. Here, as to the coloring of the dividing walls 55A, the whole dividing wall layer 56 may be colored, or only sites corresponding to wall surfaces of the dividing walls 55A may be colored. Moreover, this coloring may be performed by coloring the material making the dividing walls 55A, or by applying the relevant color to the dividing walls 55A.

Figure 20:
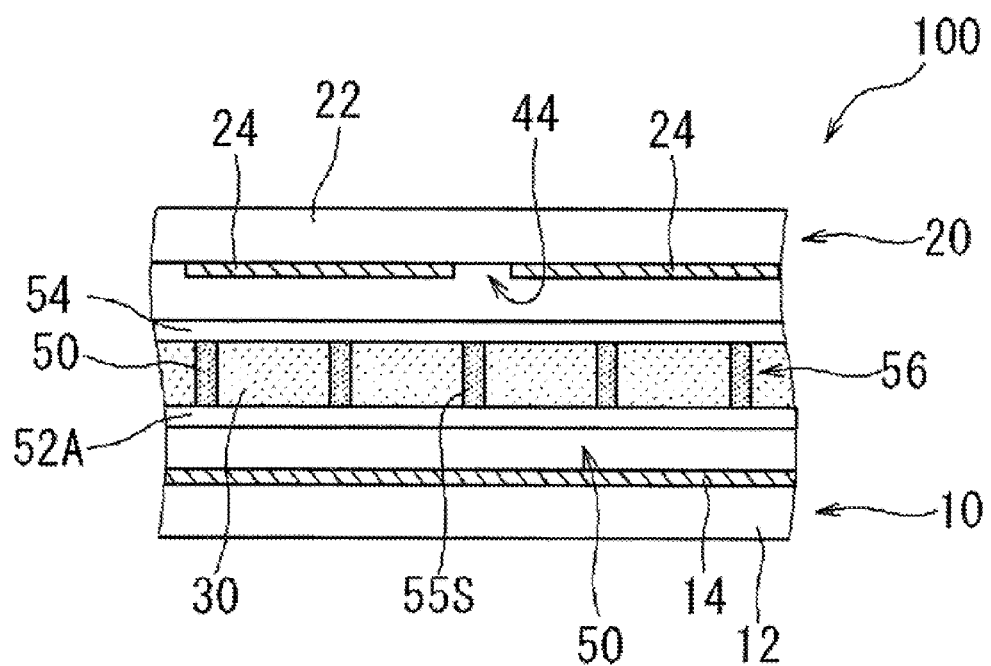
FIG. 20 is a cross-sectional view showing a modification of the electronic paper 100.

Furthermore, a modification can be made as shown in FIG. 20. In the modification shown in FIG. 20, in order to increase the visibility of the electronic paper 100, the coloring is performed to a bottom substrate 52A. Specifically, a color of the bottom substrate 52A can be similar to at least one color of the powder particles 30 (particles for image display), or can be a mixed color of the powder particles 30.

Figure 21:
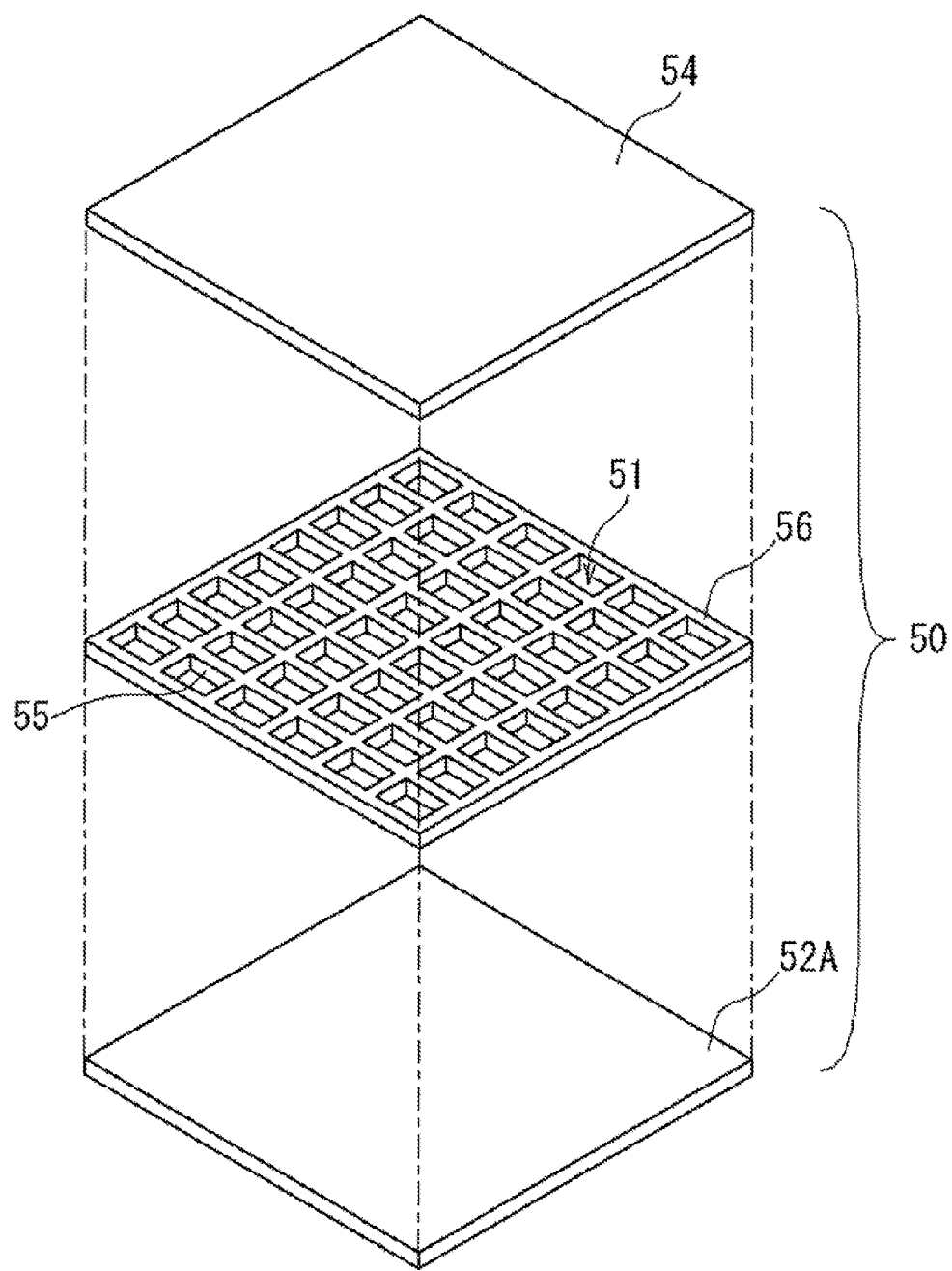
FIG. 21 is an exploded perspective view showing the modification of the powder sheet structure 50.

FIG. 21 is an exploded perspective view of the powder sheet structure 50 shown in FIG. 20. Here, as to the coloring of the bottom substrate 52A, the whole bottom substrate 52A may be colored, or only a site of an upper surface of the bottom substrate 52A may be colored. Moreover, this coloring may be performed by coloring the material making the bottom substrate 52A, or by applying the relevant color to the bottom substrate 52A. Both the modifications (colorings) shown in FIGS. 18 and 20 can be carried out.

Figure 22:
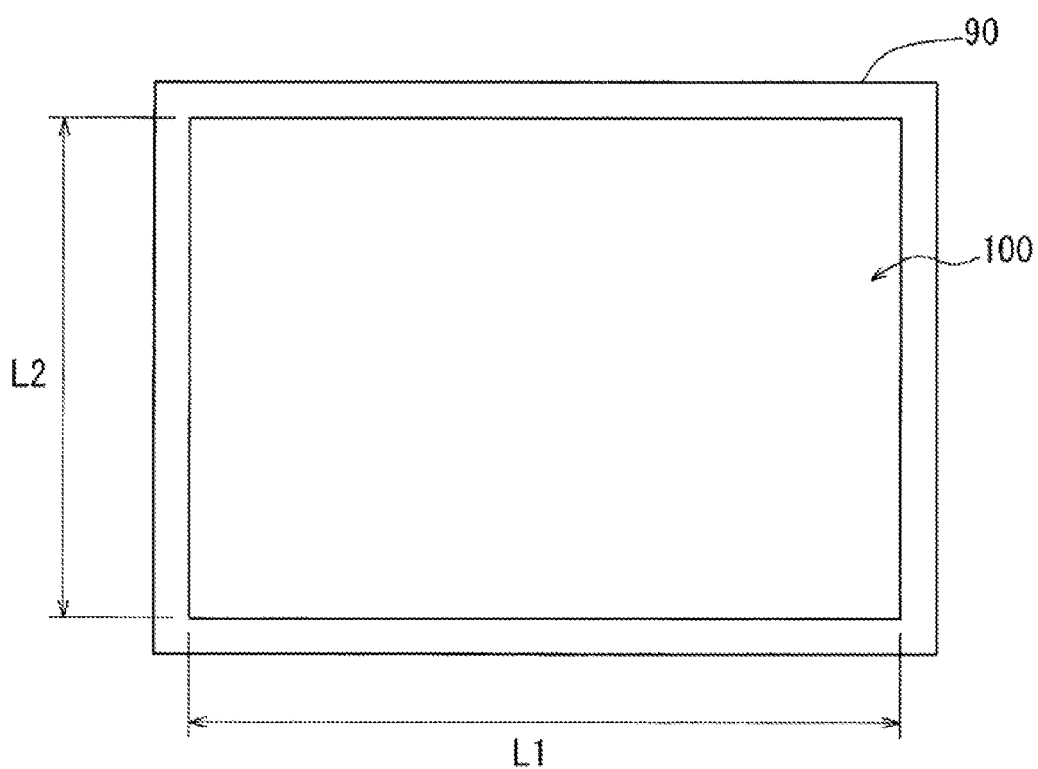
FIG. 22 is a view showing one form of the electronic paper 100.

In the electronic paper 100 of the present embodiment can be an image display device in a form including a housing 90, as shown in FIG. 22. In this case, although the electronic paper 100 can be constructed in an A5, A4 or A3 size, by making use of the characteristics of the powder sheet structures 50, the electronic paper of a large screen can also be constructed. For example, the electronic paper 100 with a length of one side (here, a long side L1) of 1 meter or more (a large-screen display device) can also be constructed. In the constitution of the present embodiment, since the plurality of powder sheet structures 50 can be used to manufacture the electronic paper 100, the large-screen display device can be manufactured at a low price, and thus, the display device is suitable for use in large-screen advertisement.

Figure 23:
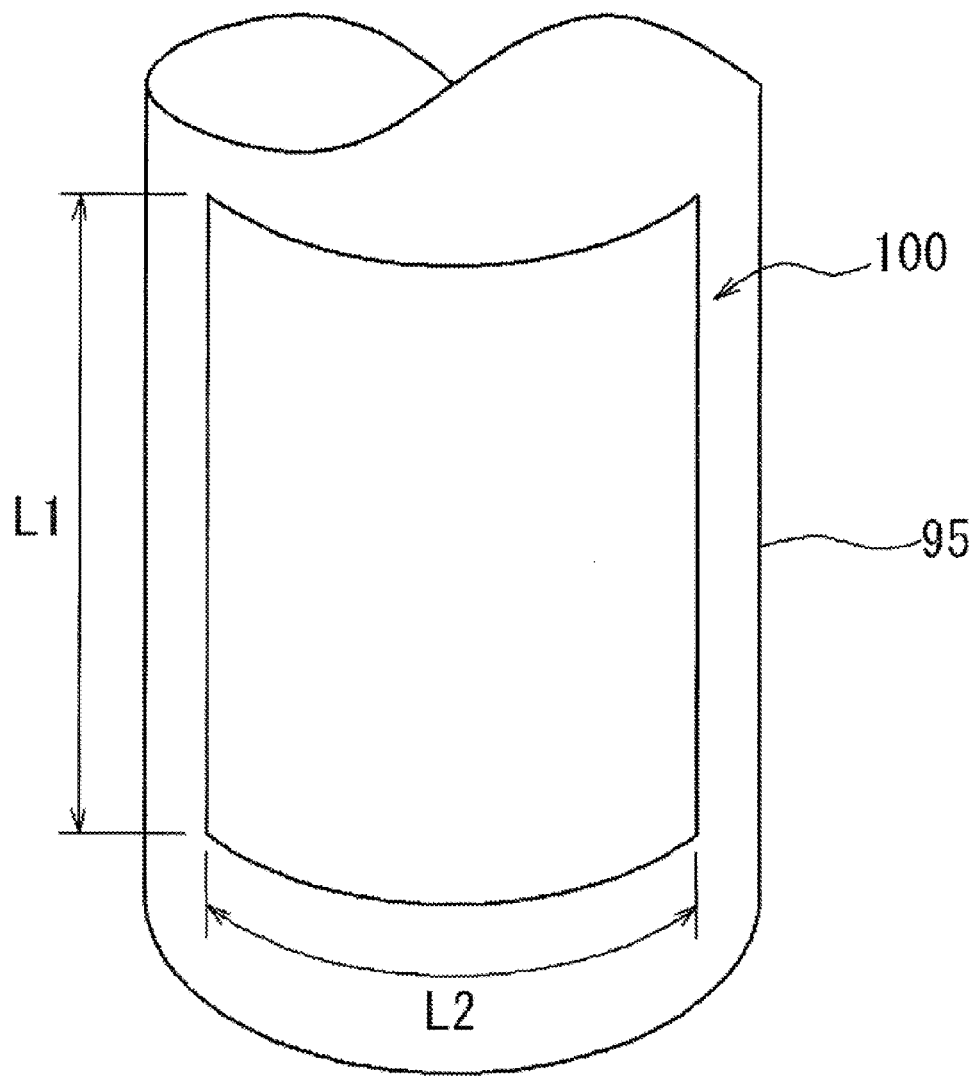
FIG. 23 is a use view in which the electronic paper 100 is used in display for advertisement.

Furthermore, in the case where the electronic paper 100 of the present embodiment has the flexibility, for example, as shown in FIG. 23, the electronic paper 100 can be used as a display device for advertisement arranged on a surface of a column 95. In the case where the lower substrate 10 and the upper substrate 20 are both made of flexible substrates, the electronic paper 100 has the flexibility, and thus can be bent. Here, the long side L1 of the electronic paper 100 can be 1 meter or more. A short side L2 may be 50 cm or less. In the electronic paper 100 of the present embodiment, since the gap 42 between the adjacent powder sheet structures 50 plays a role of assisting the flexibility of the electronic paper 100, the electronic paper 100 is preferable for use in cases where the electronic paper 100 is bent as well.

While the present invention has been described in accordance with the preferred embodiment, the description is not limitative items, and obviously, various modifications can be made.

According to the present invention, electronic paper capable of facilitating an increase in size can be provided.

EXPLANATION OF REFERENCE NUMERALS 10. first substrate (lower substrate)
12. first sheet member
14. first electrode (pixel electrode)
16. terminal
18. external connection terminal
20. second substrate (upper substrate)
22. second sheet member
24. second electrode (pixel electrode)
28. external connection terminal
30. powder particle
40. gap region
42. gap
43. adhesive
44. thermosensitive foamed particle
46. electrode absent region
50. powder sheet structure
51. cell space
52. bottom substrate
54. top substrate
55. dividing wall
56. dividing wall layer
57. adhesion layer
58. adhesion layer
59. adhesion layer
90. housing
95. column
100. electronic paper
110. substrate
120. substrate
130. dividing wall
210. lower substrate
212. lower sheet member
214. lower electrode
216. insulating layer
220. upper substrate
222. upper sheet member
224. upper electrode
226. insulating layer
230. dividing wall layer
232. dividing wall
234. adhesion layer
240. powder particle
250. cell space
270. adhesion layer forming roller
1000. electronic paper
2000. electronic paper

The invention claimed is:

1. Electronic paper comprising:
a first substrate with first electrodes;
a second substrate with second electrodes, said second substrate being arranged in opposition to the first substrate; and
a powder sheet structure arranged between the first substrate and the second substrate;
wherein the powder sheet structure comprises
a bottom substrate and a top substrate opposed to each other,
a dividing wall layer including dividing walls arranged between the bottom substrate and the top substrate, and
powder particles enclosed between the adjacent dividing walls in the dividing wall layer;
wherein the powder sheet structure is arranged so that the bottom substrate is opposed to the first electrodes of the first substrate, and that the top substrate is opposed to the second electrodes of the second substrate;
wherein each of the first substrate and the second substrate comprises one substrate sheet;
wherein the powder sheet structure is one of a plurality of powder sheet structures arrayed two-dimensionally between the first substrate and the second substrate; and
wherein the powder sheet structures have a gap provided between the powder sheet structures adjacent to each other.

2. The electronic paper according to claim 1, wherein the gap is filled with an adhesive.

3. The electronic paper according to claim 2, wherein the adhesive with which the gap is filled is softer than a material making the dividing walls.

4. The electronic paper according to claim 1, wherein the gap is filled with thermosensitive foamed particles.

5. The electronic paper according to claim 1, wherein the top substrate of each of the powder sheet structures is made of a transparent material.

6. The electronic paper according to claim 1, wherein the powder particles include a plurality of types of particles for image display, and
the dividing walls in the powder sheet structures have a similar color to at least one color of the plurality of types of particles for image display, or a mixed color of the plurality of types of particles for image display.

7. The electronic paper according to claim 1, wherein the powder particles include the plurality of types of particles for image display, and
the bottom substrate of each of the powder sheet structures has a similar color to at least one color of the plurality of types of particles for image display, or the mixed color of the plurality of types of particles for image display.

8. The electronic paper according to claim 1, wherein the first substrate, the second substrate, and the bottom substrate and the top substrate in each of the powder sheet structures are made of a flexible substrate respectively.

9. The electronic paper according to claim 1,
wherein adhesion layers are formed on outer circumferential surfaces of the bottom substrate and the top substrate in each of the powder sheet structures, respectively, and
the bottom substrate and the top substrate, and the first substrate and the second substrate are joined through the adhesion layers.

10. The electronic paper according to claim 1, wherein in each of the first substrate and the second substrate, at least one side thereof has a dimension of 1 meter or more.

11. Electronic paper comprising:
a first substrate with first electrodes;
a second substrate with second electrodes, said second substrate being arranged in opposition to the first substrate; and
powder sheet structures arranged between the first substrate and the second substrate;
wherein each of the powder sheet structures comprises
a bottom substrate and a top substrate opposed to each other,
a dividing wall layer including dividing walls arranged between the bottom substrate and the top substrate, and
powder particles enclosed between the adjacent dividing walls in the dividing wall layer;
wherein the powder sheet structures are each arranged so that the bottom substrate is opposed to the first electrodes of the first substrate, and that the top substrate is opposed to the second electrodes of the second substrate;
wherein the first electrodes in the first substrate include first pixel electrodes to move the powder particles inside the powder sheet structures;
wherein the second electrodes in the second substrate include second pixel electrodes to move the powder particles inside the powder sheet structures;
wherein the first pixel electrodes are partially formed on a side facing the powder sheet structures of surfaces of the first substrate, and the side of the first substrate facing the powder sheet structures has a region where the first pixel electrodes are formed and a first pixel electrode absent region where the first pixel electrodes are not formed;
wherein the second pixel electrodes are partially formed on a side facing the powder sheet structures of surfaces of the second substrate, and the side of the second substrate facing the powder sheet structures has a region where the second pixel electrodes are formed and a second pixel electrode absent region where the second pixel electrodes are not formed; and
wherein a gap located between the powder sheet structures is arranged, corresponding to at least one of the first pixel electrode absent region where the first pixel electrodes are not formed on the side of the first substrate facing the powder sheet structures, and the second pixel electrode absent region where the second pixel electrodes are not formed on the side of the second substrate facing the powder sheet structures.

12. A manufacturing method of electronic paper, comprising:
(a) preparing a first substrate with first electrodes;
(b) arranging a plurality of powder sheet structures on the first substrate; and
(c) arranging, on the plurality of powder sheet structures, a second substrate with second electrodes, and sandwiching the plurality of powder sheet structures between the first substrate and the second substrate,
wherein each of the powder sheet structures comprises
a bottom substrate and a top substrate opposed to each other,
a dividing wall layer including dividing walls arranged between the bottom substrate and the top substrate, and
powder particles enclosed between the adjacent dividing walls in the dividing wall layer; and
wherein each of the powder sheet structures is arranged so that the bottom substrate is opposed to the first electrodes of the first substrate, and that the top substrate is opposed to the second electrodes of the second substrate.

13. The manufacturing method of the electronic paper according to claim 12, wherein in the step (b), an end portion of the dividing wall layer of the powder sheet structure facing a seam with the adjacent other powder sheet structure is made of an end surface where at least a part of a space made by the dividing walls is opened, and the plurality of powder sheet structures are arranged adjacently to one another.

14. The manufacturing method of the electronic paper according to claim 12, wherein in the step (b), the plurality of powder sheet structures are arranged so that the seam between the powder sheet structures corresponds to an electrode absent region where the first electrodes in the first substrate are not formed.

15. The manufacturing method of the electronic paper according to claim 12, wherein in the step (b), alignment between the first substrate and the plurality of powder sheet structures is executed with alignment marks used as references.

16. The manufacturing method of the electronic paper according to claim 12, wherein in the step (c), the second substrate is arranged so that the second electrode absent region where the second electrodes in the second substrate are not formed corresponds to the seam between the powder sheet structures.

17. The manufacturing method of the electronic paper according to claim 12, wherein in the step (c), alignment between the second substrate and the plurality of powder sheet structures is executed with alignment marks used as references.

18. The manufacturing method of the electronic paper according to claim 12, wherein in the step (b), the seam between the plurality of powder sheet structures is filled with an adhesive.

* * * * *